US010638517B2

(12) United States Patent
Sun et al.

(10) Patent No.: US 10,638,517 B2
(45) Date of Patent: Apr. 28, 2020

(54) CHANNEL RESERVATION SIGNAL DESIGN FOR SHARED SPECTRUM

(71) Applicant: QUALCOMM Incorporated, San Diego, CA (US)

(72) Inventors: Jing Sun, San Diego, CA (US); Tao Luo, San Diego, CA (US); Tamer Kadous, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 15/669,772

(22) Filed: Aug. 4, 2017

(65) Prior Publication Data

US 2018/0255584 A1 Sep. 6, 2018

Related U.S. Application Data

(60) Provisional application No. 62/467,792, filed on Mar. 6, 2017.

(51) Int. Cl.
*H04W 74/08* (2009.01)
*H04W 16/14* (2009.01)
(Continued)

(52) U.S. Cl.
CPC ....... *H04W 74/0825* (2013.01); *H04W 16/14* (2013.01); *H04W 72/0453* (2013.01);
(Continued)

(58) Field of Classification Search
CPC ............. H04W 16/14; H04W 72/0453; H04W 74/0808; H04W 74/0816; H04W 72/042;
(Continued)

(56) References Cited

U.S. PATENT DOCUMENTS 10,142,045 B2 * 11/2018 Deng .................... H04W 72/08
2012/0243638 A1 * 9/2012 Maltsev ............ H04W 72/0453
375/316
(Continued)

OTHER PUBLICATIONS

International Search Report and Written Opinion—PCT/US2018/019174—ISA/EPO—dated May 15, 2018 (172813WO).

*Primary Examiner* — Awet Haile
(74) *Attorney, Agent, or Firm* — Holland & Hart LLP

(57) ABSTRACT

Methods, systems, and devices for wireless communication are described. A wireless device may use a subband of a frequency domain channel as a dedicated channel reservation (CR) sub-channel. Wireless devices may both monitor for and transmit CR signals in the CR subband. When not actively transmitting, a wireless device may monitor the CR subband to identify CR signals from other wireless devices. A wireless device communicating using the CR subband may transmit a CR signal and a pre-grant or pre-grant response simultaneously based on an frequency division multiplexing configuration. Multiple channels may share a CR subband. The CR subband may have a pre-configured frequency domain location or be at a configurable frequency in the channel. The data subband and CR subband may have different levels of synchronization, and base stations operating in the wireless communications system may consider data subband synchronization and CR subband synchronization separately.

28 Claims, 14 Drawing Sheets

(51) Int. Cl.
*H04W 72/04* (2009.01)
*H04W 24/08* (2009.01)
*H04W 56/00* (2009.01)

(52) U.S. Cl.
CPC ........ *H04W 74/0866* (2013.01); *H04W 24/08* (2013.01); *H04W 56/001* (2013.01); *H04W 74/0816* (2013.01)

(58) Field of Classification Search
CPC . H04W 72/0413; H04W 28/26; H04W 74/08; H04W 72/0406; H04W 88/02; H04W 74/002; H04W 4/70; H04W 52/0216; H04W 72/12; H04W 72/02; H04L 5/0023; H04L 27/0006; H04L 5/0005; H04L 5/003; H04L 5/0057
See application file for complete search history.

(56) References Cited

U.S. PATENT DOCUMENTS

| | | | |
|---|---|---|---|
| 2015/0334685 A1* | 11/2015 | Ji | H04W 72/0453 370/330 |
| 2016/0100406 A1 | 4/2016 | Chen et al. | |
| 2017/0013479 A1 | 1/2017 | Sun et al. | |
| 2017/0086213 A1* | 3/2017 | Kalhan | H04W 76/14 |

* cited by examiner

US 10,638,517 B2

CHANNEL RESERVATION SIGNAL DESIGN FOR SHARED SPECTRUM

CROSS REFERENCES

The present application for patent claims priority to U.S. Provisional Patent Application No. 62/467,792 by Sun et al., entitled "CHANNEL RESERVATION SIGNAL DESIGN FOR SHARED SPECTRUM," filed Mar. 6, 2017, assigned to the assignee hereof.

BACKGROUND

The following relates generally to wireless communication, and more specifically to channel reservation signal design for shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A wireless device may use contention-based procedures to reserve a channel of a radio frequency spectrum band for wireless communications. Some contention-based procedures allocate one or more time intervals of a set of resources for transmission of a reservation signal by a wireless device attempting to reserve at least a portion of the set of resources. Wireless devices may listen during these time intervals to determine whether resources are reserved by another device. Because time intervals are set aside for the transmission of reservation signals, blanking or ceasing of data transmissions from wireless devices during these intervals may be unreliable. Further, if any wireless devices are not synchronized, those wireless devices may either fail to cease data transmissions during the time intervals allocated for reservation signals or may cease data transmissions for additional time before and/or after the time intervals for reservation, which may lead to a reduction in overall throughput. If wireless devices are synchronized, blanking data transmissions often will reduce the overall data throughput of the system and thus, the number of time intervals for reservation signals may be reduced, which may result in downtime of a wireless device waiting for an opportunity to access the channel.

SUMMARY

A wireless communication system may use a subband of a frequency domain channel as a dedicated channel reservation (CR) subband. Wireless devices operating in the wireless communication system may monitor for CR signals in the CR subband and transmit CR signals in the CR subband. When not actively transmitting, a wireless device may monitor the CR subband to identify CR signals from other wireless devices. A wireless device communicating using the CR subband may transmit according to a frequency division multiplexing (FDM) configuration and, in some examples, transmit the CR signal and a pre-grant or pre-grant response (e.g., a pre-grant acknowledgment (ACK)) simultaneously based on the FDM configuration. In some examples, multiple channels may share a CR subband.

In some examples, the CR subband may have a preconfigured frequency domain location and be common across wireless devices in the wireless communication system. In other examples, the CR subband may be at a configurable frequency in the channel, such as on an edge of the frequency domain channel. In some cases, a CR subband may be distributed (e.g., non-contiguous) in the frequency domain such that the CR subband includes multiple subbands throughout a frequency band.

In some examples, a wireless device may use the same beam for the CR subband data subband. For example, the wireless device may simultaneously transmit a CR signal (e.g., on the CR subband) and a pre-grant or pre-grant response (e.g., on the data subband) on the same beam. The data subband and CR subband may have different levels of synchronization, and base stations operating in the wireless communication system may consider data subband synchronization and CR subband synchronization separately.

A method of for wireless communication is described. The method may include monitoring, by a first wireless device, a first frequency subband of a shared radio frequency spectrum band, the first frequency subband being dedicated for CR signals, determining an availability of a second frequency subband of the shared radio frequency spectrum band based on the monitoring of the first frequency subband, the second frequency subband being dedicated for data transmissions, and transmitting a CR signal using resources of the first frequency subband, the CR signal indicating a reservation of the second frequency subband based on the determined availability of the second frequency subband.

An apparatus for wireless communication is described. The apparatus may include means for monitoring, by a first wireless device, a first frequency subband of a shared radio frequency spectrum band, the first frequency subband being dedicated for CR signals, means for determining an availability of a second frequency subband of the shared radio frequency spectrum band based on the monitoring of the first frequency subband, the second frequency subband being dedicated for data transmissions, and means for transmitting a CR signal using resources of the first frequency subband, the CR signal indicating a reservation of the second frequency subband based on the determined availability of the second frequency subband.

Another apparatus for wireless communication is described. The apparatus may include a processor, memory in electronic communication with the processor, and instructions stored in the memory. The instructions may be executable by the processor to monitor, by a first wireless device, a first frequency subband of a shared radio frequency spectrum band, the first frequency subband being dedicated for CR signals, determine an availability of a second frequency subband of the shared radio frequency spectrum band based on the monitoring of the first frequency subband, the second frequency subband being dedicated for data transmissions, and transmit a CR signal using resources of the first frequency subband, the CR signal indicating a reservation of the second frequency subband based on the determined availability of the second frequency subband.

A non-transitory computer readable medium storing code for wireless communication is described. The code may include instructions executable to monitor, by a first wireless device, a first frequency subband of a shared radio frequency spectrum band, the first frequency subband being dedicated for CR signals, determine an availability of a second frequency subband of the shared radio frequency spectrum band based on the monitoring of the first frequency subband, the second frequency subband being dedicated for data transmissions, and transmit a CR signal using resources of the first frequency subband, the CR signal indicating a reservation of the second frequency subband based on the determined availability of the second frequency subband.

In some examples of the method, apparatus, and non-transitory computer-readable medium described above, determining the availability of the second frequency subband comprises: decoding a second CR signal transmitted by a second wireless device using resources of the first frequency subband, the second CR signal indicating an end of a transmission by the wireless device using resources of the second frequency subband.

Some examples of the method, apparatus, and non-transitory computer-readable medium described above may include processes, features, means, or instructions for determining a time to transmit the CR signal based at least in part on the end of the transmission by the wireless device. In some examples of the method, apparatus, and non-transitory computer-readable medium described above, the CR signal indicates a duration of use of the second frequency subband.

Some examples of the method, apparatus, and non-transitory computer-readable medium described above may include processes, features, means, or instructions for transmitting a message using resources of the second frequency subband concurrently with or after the transmission of the CR signal. In some examples of the method, apparatus, and non-transitory computer-readable medium described above, the transmission of the CR signal and the transmission of the message may be performed using the same one or more transmission beams. In some examples of the method, apparatus, and non-transitory computer-readable medium described above, the transmission of the CR signal and the transmission of the message may be performed using a single carrier waveform. Some examples of the method, apparatus, and non-transitory computer-readable medium described above may include processes, features, means, or instructions for transmitting a pre-grant signal or a pre-grant response signal concurrently with the CR signal.

Some examples of the method, apparatus, and non-transitory computer-readable medium described above may include processes, features, means, or instructions for receiving a message using resources of the second frequency subband concurrently with or after the transmission of the CR signal.

Some examples of the method, apparatus, and non-transitory computer-readable medium described above may include processes, features, means, or instructions for determining an availability of a third frequency subband of the shared radio frequency spectrum band based on the monitoring of the first frequency subband, the third frequency subband being dedicated for data transmissions. Some examples of the method, apparatus, and non-transitory computer-readable medium described above may include processes, features, means, or instructions for transmitting a second CR signal using resources of the first frequency subband, the second CR signal indicating a reservation of the third frequency subband based on the determined availability of the third frequency subband.

In some examples of the method, apparatus, and non-transitory computer-readable medium described above, the third frequency subband may be non-overlapping with the first frequency subband and the second frequency subband. In some examples of the method, apparatus, and non-transitory computer-readable medium described above, at least a portion of the third frequency subband overlaps at least a portion of the second frequency subband. In some examples of the method, apparatus, and non-transitory computer-readable medium described above, at least a portion of the first frequency subband overlaps at least a portion of the second frequency subband.

In some examples of the method, apparatus, and non-transitory computer-readable medium described above, the first frequency subband comprises a plurality of non-contiguous partitions of the shared radio frequency spectrum band. In some examples of the method, apparatus, and non-transitory computer-readable medium described above, the first frequency subband and the second frequency band may be interlaced in a frequency domain. In some examples of the method, apparatus, and non-transitory computer-readable medium described above, the second frequency subband spans a bandwidth larger than the first frequency subband. In some examples of the method, apparatus, and non-transitory computer-readable medium described above, the first frequency subband may be located at an edge of a channel of the shared radio frequency spectrum band.

Some examples of the method, apparatus, and non-transitory computer-readable medium described above may include processes, features, means, or instructions for assuming a first base station synchronization granularity for the first frequency subband and a second base station synchronization granularity for the second frequency subband; wherein the first base station synchronization granularity may be different from the second base station synchronization granularity.

DETAILED DESCRIPTION

A wireless device may use contention-based procedures in order to reserve a frequency domain channel in a radio frequency spectrum band. The wireless device may transmit channel reservation (CR) signals using the same frequency domain channel that the wireless device uses for data communication. In some examples, a wireless communications system may allocate a subband of a frequency domain channel as a dedicated CR subband and use the remaining subband of the frequency domain channel as a data subband.

Wireless devices operating in the wireless communication system may monitor for CR signals in the CR subband and transmit CR signals in the same subband. When not actively transmitting, a wireless device may monitor the CR subband to identify CR signals from other wireless devices. A wireless device communicating using the CR subband may transmit according to a frequency division multiplexing (FDM) configuration and, in some examples, transmit the CR signal and a pre-grant or pre-grant response (e.g., a pre-grant acknowledgment (ACK)) simultaneously based on the FDM configuration. In some examples, multiple frequency domain channels may share a single CR subband.

In some examples, the CR subband may have a preconfigured frequency domain location, and may be common across wireless devices in the wireless communication system. In other examples, the CR subband may be at a configurable frequency in the channel, such as on an edge of the frequency domain channel. In other examples, the portion of the channel designated as a CR subband may be distributed (e.g., non-contiguous) in the frequency domain, which may include frequency portions of the CR subband being interlaced with frequency portions of a data subband. In some examples, the wireless device may use the same beam (e.g., according to the same beamforming parameters, such as along a same beam direction or according to a same beam width) for the CR subband and data subband. For example, the wireless device may simultaneously transmit a CR signal (e.g., on the CR subband) and a pre-grant or pre-grant response (e.g., on the data subband) on the same beam. The data subband and CR subband may have different levels of synchronization, and base stations operating in the wireless communication system may consider data subband synchronization and CR subband synchronization separately.

Aspects of the disclosure are initially described in the context of a wireless communications system. Aspects of the disclosure are further illustrated by and described with reference to process flow diagrams, apparatus diagrams, system diagrams, and flowcharts that relate to CR signal design for shared spectrum.

Figure 1:
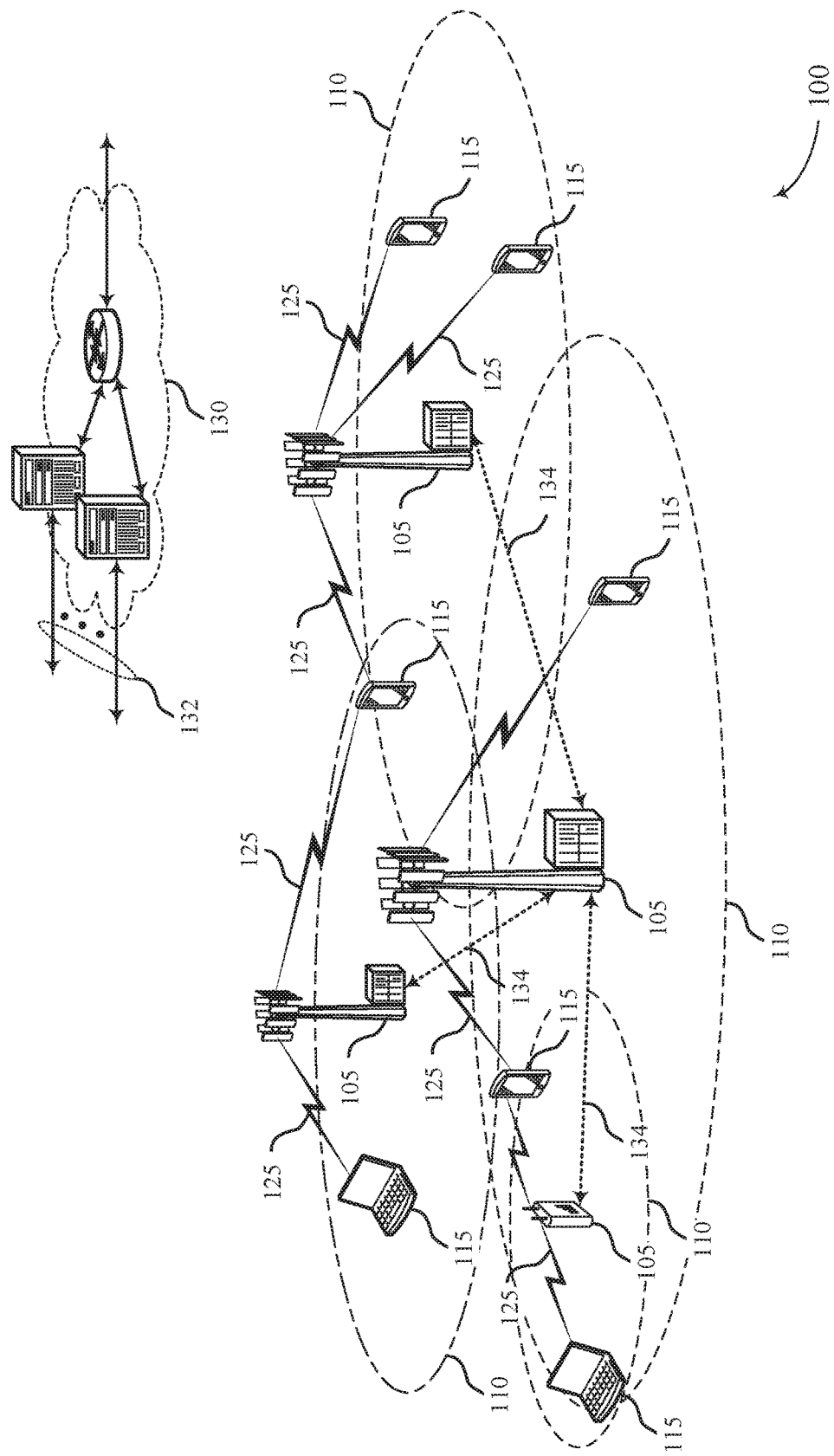
FIG. 1 illustrates an example of a wireless communications system that supports CR signal design for shared spectrum in accordance with aspects of the present disclosure.

FIG. 1 illustrates an example of a wireless communications system 100 that supports CR signal design for shared spectrum in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced mobile broadband communications, ultra-reliable (e.g., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid ARQ (HARM) to provide retransmission at the MAC layer to improve link efficiency. In the control plane, the radio resource control (RRC) protocol layer may provide establishment, configuration, and maintenance of an RRC connection between a UE 115 and a base station 105-c, a base station 105-b, or core network 130 supporting radio bearers for user plane data. At the physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The wireless communications system 100 may support a CR signal design for shared spectrum such that a wireless device (e.g., a UE 115 or a base station 105) may monitor for and transmit CR signals on a dedicated CR subband or sub-channel. In some examples, a frequency domain channel used by the wireless device may be divided into a dedicated CR subband and a data subband. In other examples, the CR subband may be a standalone frequency domain channel in the same band as a data channel, but non-overlapping with the data channel. Multiple wireless devices may use the CR subband to reserve the channel, and the CR subband may be used for CR of multiple frequency domain channels.

Figure 2:
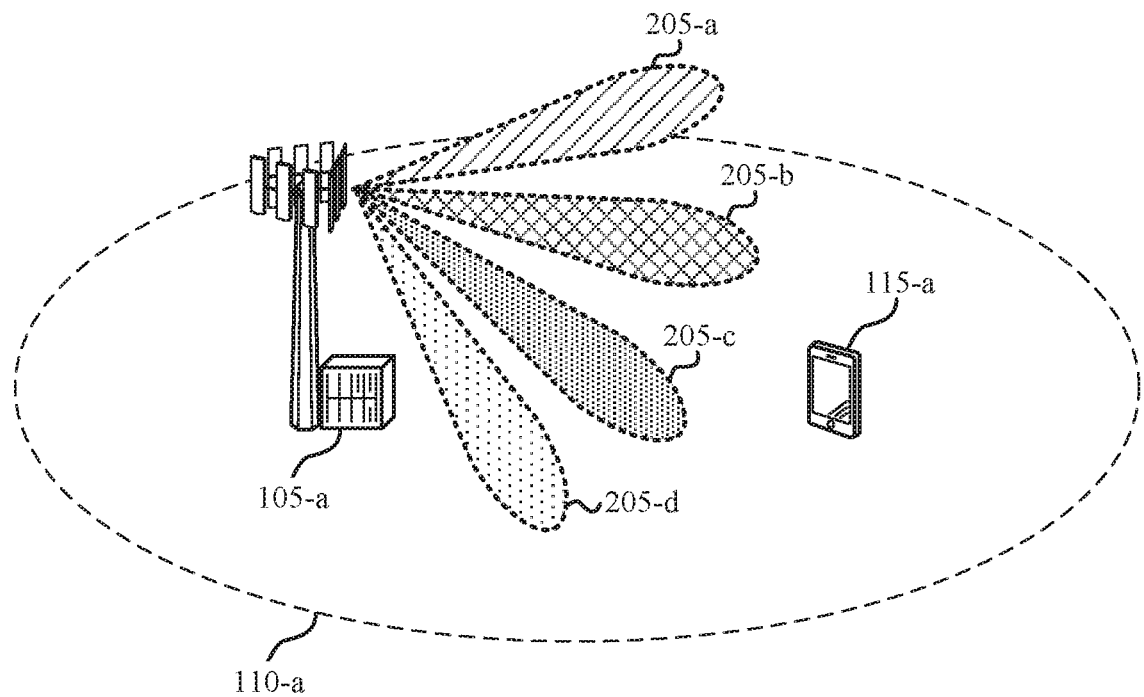
FIG. 2 illustrates an example of a wireless communications system that supports CR signal design for shared spectrum in accordance with aspects of the present disclosure.

FIG. 2 illustrates an example of a wireless communications system 200 that supports CR signal design for shared spectrum in accordance with aspects of the present disclosure. UE 115-*a* and base station 105-*a* may be respective examples of a UE 115 and base station 105 as described herein with reference to FIG. 1. In wireless communications system 200, a UE 115-*a* may communicate with a base station 105-*a* over a shared radio frequency spectrum band within coverage area 110-*a*. In some cases, the UE 115-*a* and the base station 105-*a* may communicate via one or more beams 205. For example, base station 105-*a* may transmit data or control information to the UE 115-*a* over beam 205-*a*. In another example, the base station 105-*a* may transmit a signal (e.g., synchronization signals, reference signals) over each beam 205 and the UE 115-*a* may determine a beam 205 suitable for communication. For instance, signals carried by beams 205-*a* and 205-*d* may not be received by the UE 115-*a*, but the UE 115-*a* may receive signals carried by beam 205-*b* and 205-*c*. The UE 115-*a* may then determine that the signal strength associated with beam 205-*b* is greater than the signal strength associated with beam 205-*c* and may select beam 205-*b* for communication with the base station 105-*a*.

UE 115-*a* and base station 105-*a* may reserve a channel for communication using a CR subband. For example, one or both of UE 115-*a* or base station 105-*a* may reserve the channel by monitoring the CR subband and transmitting a CR signal on the CR subband when the CR subband is available.

The wireless communications system 200 may allocate a subband of a frequency domain channel as a dedicated CR subband. In some examples, the remaining subband of the frequency domain channel may be dedicated as a data subband. The CR subband may have a pre-configured frequency domain location, and may be common across wireless devices in the wireless communications system 200. For example, any node operating in the wireless communications system 200 may monitor for CR signals in the CR subband. If the CR subband indicates that a frequency domain channel is available (e.g., if no CR signal from another wireless device has been transmitted in the CR subband), the node may transmit one or more CR signals in the CR subband. In some cases, separating the CR subband from a data subband may reduce CR signal puncturing or data blanking to protect CR signal transmission.

The CR subband may be considered to be a fixed overhead for the wireless communications system 200. In some examples, the CR subband may have a configurable bandwidth in that the CR subband for a given frequency domain channel may span various portions of a frequency band. In other cases, the CR subband for a first frequency domain channel may span a first bandwidth of a frequency band and the CR subband for a second frequency domain channel may span a second bandwidth of the frequency band, which may be different from the first bandwidth. A wireless device communicating using the CR subband may transmit according to an FDM configuration. For example, the wireless device may transmit a CR signal concurrently with one or more other signals. In some examples, the wireless device may transmit the CR signal along with a pre-grant or pre-grant response concurrently or at least during the same time interval (e.g., the same slot, the same subframe, the same symbol period, etc.) and in accordance with the FDM configuration.

The frequency and corresponding bandwidth of the CR subband may be a configurable frequency within a given frequency domain channel or frequency band. In some examples, the CR subband may be on an edge of the frequency domain channel (e.g., adjacent to a frequency maximum or a frequency minimum of the frequency domain channel such that the CR subband does not split a data subband spanning the frequency domain channel). If the CR subband is on an edge of the frequency domain channel, a wireless device may use a single carrier FDM (SC-FDM) waveform for an uplink data transmission on the data subband without interruption of the SC-FDM waveform. In some cases, if the CR subband is not on an edge of the frequency domain channel (e.g., such that the data subband is divided), a wireless device using the frequency domain channel may still transmit data using an SC-FDM waveform if the data resource allocation is on one side of the CR subband. Alternatively, a CR signal may be transmitted using a different waveform (e.g., a different SC-FDM waveform, or an orthogonal frequency division multiplexed (OFDM) waveform).

In some examples, the portion of the frequency domain channel designated as a CR subband may not be contiguous in the frequency domain. For instance, distribution of the CR subband (e.g., such that the CR subband is non-contiguous) may allow for frequency diversity and an increased likelihood of successful transmission and reception of a CR signal transmitted in the CR subband. In some examples, OFDM symbol-level synchronization may be used for reception or detection of CR signals transmitted using a distributed CR subband. Alternatively, if a wireless device communicating using the distributed CR subband is not synchronized at the OFDM symbol-level with the CR subband, transmission of a CR signal using the distributed CR subband may still allow for frequency diversity. For example, the wireless device may send a CR signal in the CR subband (e.g., a CR signal in each subband of a frequency band allocated for CR), and a receiving wireless device may separately monitor each of the subbands to receive the CR signal from each subband. The receiving device may then combine the CR signals from the multiple subbands in order to successfully decode the CR signal. In some examples, a distributed CR subband may be distributed within a given bandwidth of a frequency band. For instance, when considering a balance between frequency diversity and receiver monitoring and processing complexity, the CR subband may include multiple subbands distributed among a given portion of a frequency band rather than being distributed throughout the entire system frequency band.

When not actively transmitting, a wireless device may monitor the CR subband to identify CR signals transmitted by other wireless devices within the wireless communications system. Since data is transmitted over the data subband and not the CR subband, the CR signal detection may be interfered with by thermal noise and interference from other CR signals.

In some examples, the wireless device (e.g., UE 115-*a* or base station 105-*a*) may use the same beam 205 for the CR subband and data subband. For example, the wireless device may transmit a CR signal on a beam 205 used for transmitting a pre-grant or pre-grant response on the data channel. If multi-beam communication (e.g., spatial division multiple access (SDMA)) is used, base station 105-*a* may monitor for CR signals in a multi-beam fashion and may use the same multi-beam for data and CR signals. In some examples, UE 115-*a* may enter a low-power mode and may utilize a narrow frequency band. For example, the UE 115-*a* may be an IoT device that may transmit or receive data periodically or relatively infrequently. In this instance, the UE 115-*a* may be configured to monitor the CR subband over a narrow band or a separate dedicated band even when in low power mode.

A wireless device may use both the CR subband and data subband simultaneously according to an FDM configuration. For example, if base station 105-*a* is reserving the channel for downlink communication, base station 105-*a* may transmit a CR-transmit (CR-T) signal in the CR subband and a pre-grant in the data channel simultaneously. In some cases, the same beam 205 may be used for transmission of the CR-T signal and the pre-grant signal. As a result of using separate frequency domain channels, the transmission of the pre-grant signal may not interfere with the CR-T transmission. To confirm receipt of the pre-grant, UE 115-*a* may transmit a pre-grant response in the data channel. The pre-grant response signal may be transmitted along with a CR-receive (CR-R) signal in the CR subband. In some examples, a same beam 205 of the UE 115-*a* (not shown) used for receiving the CR-T signal may be used for the transmission of the pre-grant response and the CR-R signal. After reserving the channel, base station 105-*a* may transmit a grant to UE 115-*a*, which may be followed by downlink data on the data subband.

The data subband and CR subband may have different levels of synchronization. For instance, wireless devices utilizing the CR subband may not be synchronized with one another. Additionally or alternatively, a given data channel or subband may not be synchronized with the CR subband. Thus, in some cases, wireless devices (e.g., base station 105-*a*, UE 115-*a*) operating in the wireless communication system may consider data subband synchronization and CR subband synchronization separately. For example, the base station 105-*a* may synchronize with a given data channel or subband or a given CR subband and the UE 115-*a* may synchronize with the base station 105-*a* (e.g., using primary synchronization signals (PSSs) and secondary synchronization signals (SSSs)).

In some cases, the data subband and CR subband may be asynchronous, such that a time interval (e.g., a slot, a subframe, a mini-slot, etc.) of the data subband may not align in time with a time interval of the CR subband. In other cases, the data subband and the CR subband may be synchronized with each other at an OFDM symbol period level, a slot level, or a frame level, etc. In some examples, a common clock, or other suitable synchronizing mechanism, may not be used if the data subband and the CR subband have different levels of synchronization as each combination of synchronization between the CR subband and the data subband may involve different configurations of the wireless communication system.

In some examples, multiple frequency domain channels may share a common CR subband. The CR subband may be a part of one of the frequency domain channels in the group (e.g., by partitioning a single frequency domain channel into a CR subband and a data subband, as described above), or the CR subband may be a standalone frequency domain channel in the same frequency band as a group of frequency domain channels. The frequency domain channels in the group of frequency domain channels may or may not be adjacent to one another, but in some cases, the frequency domain channels may all be within the same frequency band such that each frequency domain channel may have similar signal propagation characteristics. In some examples, some frequency domain channels in the group of frequency domain channels may be partial channels (e.g., overlapping) or may have varying bandwidth. Wireless devices using one of the frequency domain channels may monitor and use the common CR subband. If the common CR subband is in or adjacent to a frequency domain channel a wireless device is using, the wireless device may use the same radio frequency (RF) chain for using and monitoring the CR subband. Alternatively, if the CR subband is allocated far from the data channel (e.g., in a same frequency band but a different frequency domain channel), the wireless device may use a different RF chain to monitor and use the CR subband.

Figure 3:
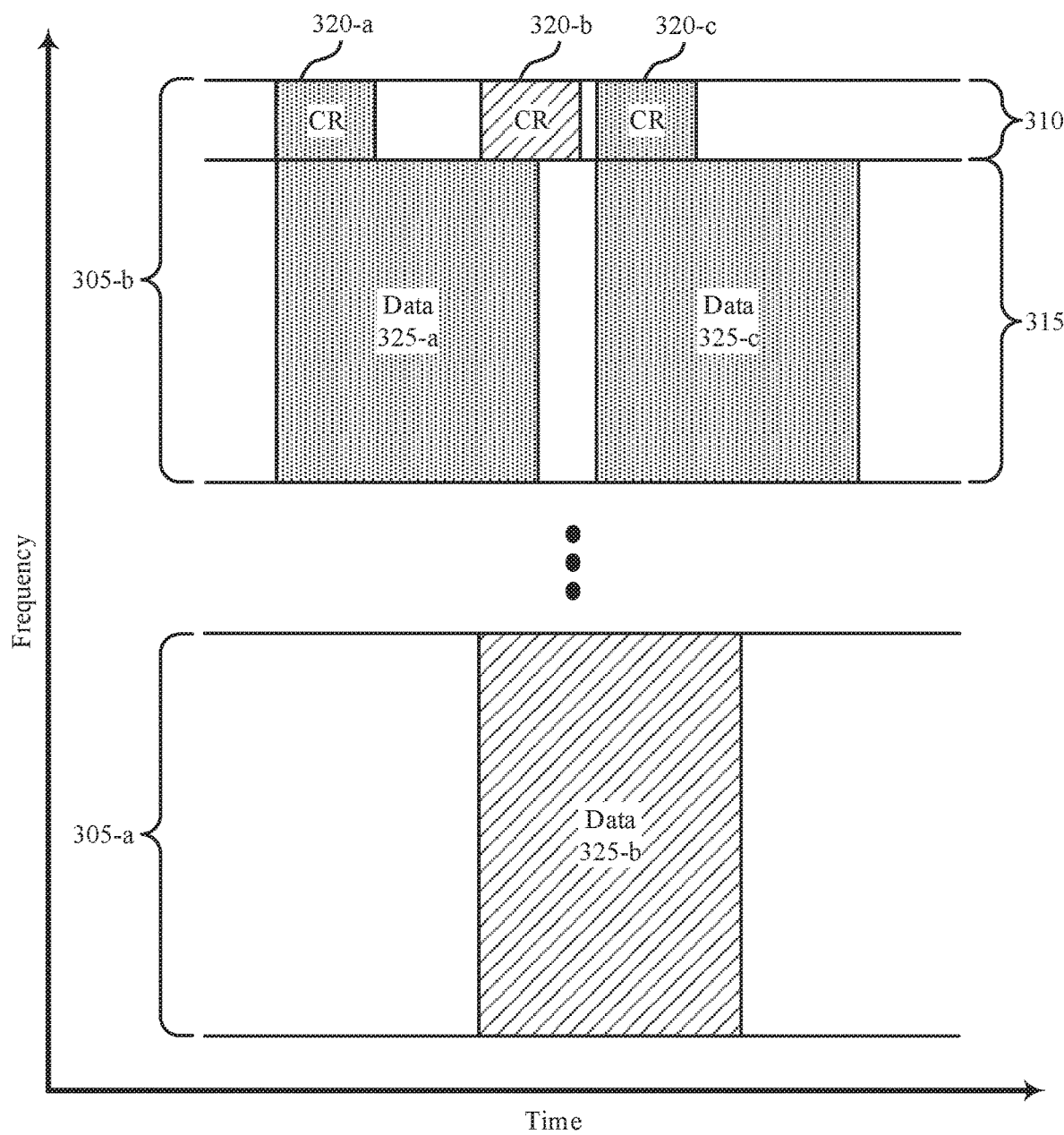
FIG. 3 illustrates an example of a frequency-time plot that supports CR signal design for shared spectrum in accordance with aspects of the present disclosure.

FIG. 3 illustrates an example frequency-time plot 300 that supports CR signal design for shared spectrum in accordance with aspects of the present disclosure. As shown in the frequency-time plot 300, frequency domain channel 305-*a* and frequency domain channel 305-*b* may be utilized for wireless communications between wireless device (e.g., a UE 115 or a base station 105). In some cases, frequency domain channels 305-*a* and 305-*b* may be within a shared radio frequency spectrum band and may be reserved by a wireless device through the transmission of a CR signal.

Wireless devices may use a CR subband 310 for reservation of the one or more frequency domain channels 305. In some examples, frequency domain channel 305-*a* and frequency domain channel 305-*b* may be in the same frequency band or may be adjacent to one another. In other examples, frequency domain channel 305-*a* and frequency domain channel 305-*b* may be in different frequency bands or otherwise not adjacent to each other. Wireless devices may use frequency domain channel 305-*a* and frequency domain channel 305-*b* (e.g., or other frequency domain channels 305 not shown) by monitoring the CR subband 310 and listening for CR signals transmitted by other wireless devices that indicate reservation of one or more of the frequency domain channels 305-*a* and 305-*b*. Based on the monitoring, a wireless device may transmit a CR signal on the CR subband 310 to reserve frequency domain channel 305-*a* or frequency domain channel 305-*b*. As shown in this example, frequency domain channel 305-*b* may be split into the CR subband 310 and a data subband 315, but in other examples, the CR subband 310 may be a separate subchannel within the frequency band or may be within frequency domain channel 305-*a*. In some cases, frequency domain channels 305-*a* and 305-*b* may be partially overlapping frequency domain channels. Additionally or alternatively, frequency domain channels 305-*a* and 305-*b* may span different bandwidths of the frequency band.

In accordance with aspects of the present disclosure, a data transmission on frequency domain channel 305-*a* may not affect a data transmission on frequency domain channel 305-*b*. For example, a first wireless device wishing to transmit or receive data using frequency domain channel 305-*b* may monitor the CR subband 310 to determine if data subband 315 of frequency domain channel 305-*b* is available. Based on the determination, the first wireless device may transmit a CR signal 320-*a* on CR subband 310 to reserve the data subband 315. After or concurrently with transmission of the CR signal 320-*a*, the first wireless device may transmit or receive data 325-*a* via data subband 315. In some examples, CR signal 320-*a* may identify the data subband 315 and a duration that the data subband 315 is reserved so that a second device monitoring the CR subband 310 may be able to determine that data subband 315 is reserved. A second wireless device, however, may still be able to reserve frequency domain channel 305-*a*, even while data 325-*a* is being exchanged with the first wireless device. By monitoring the CR subband and determining the availability of frequency domain channel 305-*a*, the second wireless device may transmit CR signal 320-*b* on the CR subband 310 to reserve frequency domain channel 305-*a*. After or concurrently with the transmission of CR signal 320-*b*, the second wireless device may exchange (e.g., transmit or receive) data 325-*b* using frequency domain channel 305-*a*.

In some cases, after transmitting or receiving data 325-*a* in data subband 315, the first wireless device may again monitor the CR subband 310 and transmit CR signal 320-*c* to reserve the data subband 315. Thereafter or concurrently with the transmission of the CR signal 320-*c*, the first wireless device may exchange data 325-*c* over data subband 315. In other examples, a third wireless device may transmit the CR signal 320-*c* to reserve the data subband 315 and transmit or receive data 325-*c*.

Figure 4A:
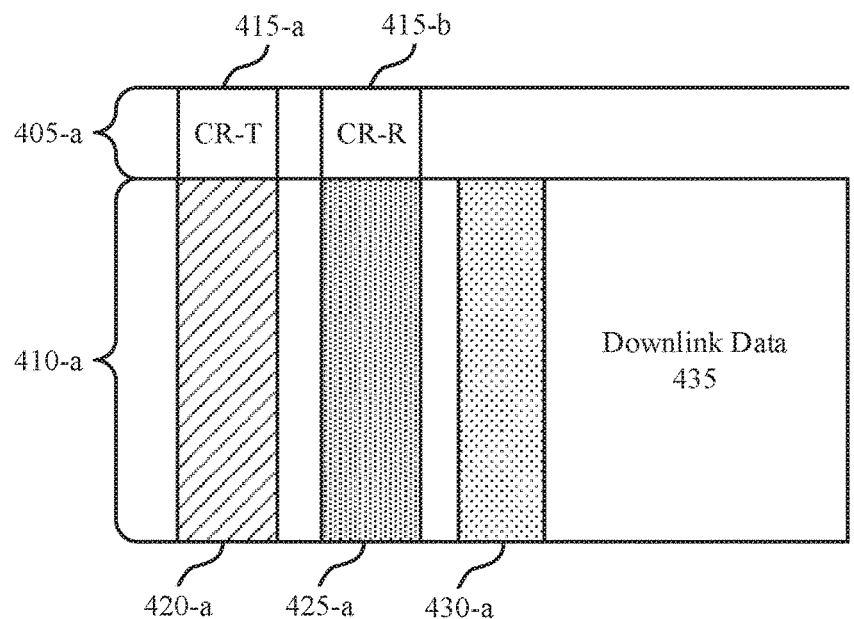
FIGS. 4A and 4B illustrate timing diagrams for a downlink channel reservation and an uplink channel reservation that support CR signal design for shared spectrum in accordance with aspects of the present disclosure.
Figure 4B:
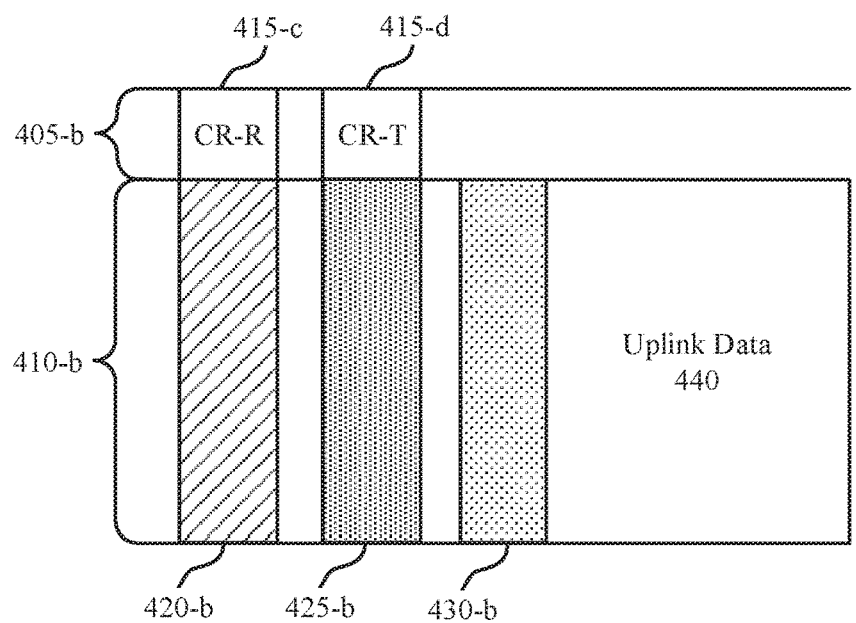

A wireless device may reuse use various RF chains for communication over both a data channel (e.g., frequency domain channel 305-*a* or data subband 315) and the CR subband 310. For example, if a wireless device is transmitting using frequency domain channel 305-*b*, and the CR subband 310 is inside or adjacent to frequency domain channel 305-*b*, the wireless device may use the same RF chain for the CR subband 310 and a data channel (e.g., data subband 315). Alternatively, if the wireless device is transmitting using a frequency domain channel 305 that is farther away in frequency (e.g., frequency domain channel 305-*a*) the wireless device may use different RF chains to use the frequency domain channel 305 and to monitor and use the CR subband 310. In some examples this may include transmitting a CR signal 320 and transmitting data on a data channel on separate single carrier waveforms FIGS. 4A and 4B illustrate timing diagrams for a downlink channel reservation 400-*a* and an uplink channel reservation 400-*b* that support CR signal design for shared spectrum in accordance with aspects of the present disclosure. Downlink channel reservation 400-*a* and uplink channel reservation 400-*b* may represent communication between a base station 105 and a UE 115, as described herein with reference to FIGS. 1 and 2. As shown, a CR subband 405 may be allocated a frequency subband adjacent to a data channel 410, but in some cases, the CR subband 405 may be a separate frequency domain channel in the same frequency band or may span non-contiguous subbands within one or more frequency bands.

In FIG. 4A, a base station 105 may reserve a frequency domain channel for a downlink data transmission to a UE 115. The base station 105 may transmit a CR-T signal 415-*a* on the CR subband 405-*a* and in some cases, may simultaneously transmit a pre-grant 420-*a* on the data channel 410-*a*. In some examples, the CR-T signal 415-*a* and the pre-grant 420-*a* may be transmitted using the same beam. Pre-grant 420-*a* may include information related to the channel reservation for the UE 115 (e.g., for the downlink data 435). In some examples the CR-T signal 415-*a* may be associated with a reservation of the data channel 410-*a* for a duration that supports a subsequent transmission of a downlink resources grant (e.g., downlink resources grant 430-*a*) or downlink data (e.g., downlink data 435) associated with the pre-grant 420-*a*.

The UE 115 may receive the pre-grant 420-*a*, and in response, the UE 115 may transmit a pre-grant response 425-*a* on the data channel 410-*a* and a CR-R signal 415-*b* on the CR subband 405-*a*. The UE 115 may transmit the pre-grant response 425-*a* and the CR-R signal 415-*b* using the same beam. In some examples the UE 115 may transmit the pre-grant response 425-*a* and the CR-R signal 415-*b* using the same beam as was used to receive the pre-grant 420-*a* from the base station 105, which may also be a beam used by the UE 115 for receiving downlink data. In some examples the CR-R signal 415-*b* may be associated with a reservation of the data channel 410-*a* for a duration that supports a subsequent reception of a downlink resources grant (e.g., downlink resources grant 430-*a*) or downlink data (e.g., downlink data 435) associated with the pre-grant 420-*a* or the pre-grant response 425-*a*. In some examples, the duration of the channel reservation of the CR-R signal 415-*b* may be based at least in part on the duration of the channel reservation of the CR-T signal 415-*a* (e.g., a duration starting at a different time, but concluding at the same time, or a duration starting at a different time and concluding at a different time, but reserving the data channel 410-*a* for a same amount of time).

The transmission of both a CR-T signal 415-*a* by the base station 105 and a CR-R signal 415-*b* by the UE 115 may improve the reservation of the data channel 410-*a* (e.g., reducing interference with the communication of the downlink resources grant 430-*a* or the downlink data 435). For example, when the coverage areas associated with CR transmission for the base station 105 and the UE 115 are not entirely overlapping, the CR-T signal 415-*a* and the CR-R signal 415-*b* may be received by different devices. In one example, a wireless device that neighbors the UE 115 may not be able to detect the CR-T signal 415-*a* transmitted by the base station 105, but the wireless device may be prevented from reserving the data channel 410-*a* based at least in part on detecting the CR-R signal 415-*b* transmitted by the UE 115. Thus, the transmission of both a CR-T signal 415-*a* by the base station and a CR-R signal 415-*b* by the UE 115 for the downlink channel reservation 400-*a* may prevent more devices from interfering with the communication of the downlink resources grant 430-*a* or the downlink data 435 on the data channel 410-*a* than when only a CR-T signal 415-*a* or a CR-R signal 415-*b* is transmitted.

In some examples the UE 115 may transmit the pre-grant response 425-*a* on the data channel 410-*a* because a channel reservation of the CR-T signal 415-*a* does not include the duration used by the UE 115 to transmit the pre-grant response 425-*a*. In other examples, the channel reservation of the CR-T signal 415-*a* may include the duration used by the UE 115 to transmit the pre-grant response 425-*a*, and the UE 115 may be permitted to transmit the pre-grant response 425-*a* on the data channel 410-*a* despite the channel reservation of the CR-T signal 415-*a*. For example, the UE 115 may monitor the CR subband 405-*a* and detect the CR-T signal 415-*a*, but the UE 115 may subsequently determine that the data channel 410-*a* is available for the pre-grant response 425-*a* based at least in part on receiving the pre-grant 420-*a*. In other words, the UE 115 may interpret the pre-grant 420-*a* associated with CR-T signal 415-*a* as an implicit or explicit permission to use the data channel 410-*a* for transmitting the responsive pre-grant response 425-*a*. In other examples, the transmission of the pre-grant response 425-*a* may be otherwise allowed to ignore or supersede a detection of the CR-T signal 415-*a*.

The base station 105 may receive the pre-grant response 425-*a*, and in response, the base station 105 may transmit downlink resources grant 430-*a* to the UE 115 and transmit downlink data 435 using data channel 410-*a* on the downlink resources.

In some examples the base station 105 may transmit the downlink resources grant 430-*a* or the downlink data 435 on the data channel 410-*a* because a channel reservation of the CR-R signal 415-*b* does not include the duration used by the base station 105 to transmit the downlink resources grant 430-*a* or the downlink data 435. In other examples, the channel reservation of the CR-R signal 415-*b* may include the duration used by the base station 105 to transmit the downlink resources grant 430-*a* or the downlink data 435, and the base station 105 may be permitted to transmit the downlink resources grant 430-*a* or the downlink data 435 on the data channel 410-*a* despite the channel reservation of the CR-R signal 415-*b*. For example, the base station 105 may monitor the CR subband 405-*a* and detect the CR-R signal 415-*b*, but the base station 105 may subsequently determine that the data channel 410-*a* is available for the downlink resources grant 430-*a* or the downlink data 435 based at least in part on receiving the pre-grant response 425-*a*. In other words, the base station 105 may interpret the pre-grant response 425-*a* associated with the CR-R signal 415-*b* as an implicit or explicit permission to use the data channel 410-*a* for transmitting the responsive downlink resources grant 430-*a* or the downlink data 435. In other examples, the transmission of the downlink resources grant 430-*a* or the downlink data 435 may be otherwise allowed to ignore or supersede a detection of the CR-R signal 415-*b* (e.g., because the base station 105 had already reserved the data channel 410-*a* for the downlink resources grant 430-*a* or the downlink data 435 by transmitting the CR-T signal 415-*a*).

In FIG. 4B, the base station 105 may reserve a frequency domain channel for an uplink data transmission from the UE 115. The base station 105 may transmit a CR-R signal 415-*c* on the CR subband 405-*b* and in some cases, may simultaneously transmit pre-grant 420-*b* on the data channel 410-*b*. In some examples, CR-R signal 415-*c* and pre-grant 420-*b* may be transmitted using the same beam. Pre-grant 420-*b* may include information related to the channel reservation for the UE 115 (e.g., for the uplink data 440). In some examples the CR-R signal 415-*c* may be associated with a reservation of the data channel 410-*b* for a duration that supports a subsequent transmission of a uplink resources grant (e.g., uplink resources grant 430-*b*) or uplink data (e.g., uplink data 440) associated with the pre-grant 420-*b*.

The UE 115 may receive the pre-grant 420-*b*, and in response, the UE 115 may transmit a pre-grant response 425-*b* on the data channel 410-*b* and a CR-T signal 415-*d* on the CR subband 405-*b*. The UE 115 may transmit pre-grant response 425-*b* and CR-R signal 415-*d* using the same beam. In some examples the UE 115 may transmit the pre-grant response 425-*b* and the CR-T signal 415-*d* using the same beam as was used to receive the pre-grant 420-*c* from the base station 105, which may also be a beam used by the UE 115 for receiving uplink resources grants or for transmitting uplink data. In some examples the CR-T signal 415-*d* may be associated with a reservation of the data channel 410-*b* for a duration that supports a subsequent reception of a uplink resources grant (e.g., uplink resources grant 430-*b*) or transmission of uplink data (e.g., uplink data 440) associated with the pre-grant 420-*b* or the pre-grant response 425-*b*. In some examples, the duration of the channel reservation of the CR-T signal 415-*d* may be based at least in part on the duration of the channel reservation of the CR-R signal 415-*c* (e.g., a duration starting at a different time, but concluding at the same time, or a duration starting at a different time and concluding at a different time, but reserving the data channel 410-*b* for a same amount of time).

The transmission of both a CR-R signal 415-*c* by the base station 105 and a CR-T signal 415-*d* by the UE 115 may improve the reservation of the data channel 410-*b* (e.g., reducing interference with the communication of the uplink resources grant 430-*b* or the uplink data 440). For example, when the coverage areas associated with CR transmission for the base station 105 and the UE 115 are not entirely overlapping, the CR-R signal 415-*c* and the CR-T signal 415-*d* may be received by different devices. In one example, a wireless device that neighbors the UE 115 may not be able to detect the CR-R signal 415-*c* transmitted by the base station 105, but the wireless device may be prevented from reserving the data channel 410-*b* based at least in part on detecting the CR-T signal 415-*d* transmitted by the UE 115. Thus, the transmission of both a CR-R signal 415-*c* by the base station and a CR-T signal 415-*d* by the UE 115 for the uplink channel reservation 400-*b* may prevent more devices from interfering with the communication of the uplink resources grant 430-*b* or the uplink data 440 on the data channel 410-*b* than when only a CR-R signal 415-*c* or a CR-T signal 415-*d* is transmitted.

In some examples the UE 115 may transmit the pre-grant response 425-*b* on the data channel 410-*b* because a channel reservation of the CR-R signal 415-*c* does not include the duration used by the UE 115 to transmit the pre-grant response 425-*b*. In other examples, the channel reservation of the CR-R signal 415-*c* may include the duration used by the UE 115 to transmit the pre-grant response 425-*b*, and the UE 115 may be permitted to transmit the pre-grant response 425-*b* on the data channel 410-*b* despite the channel reservation of the CR-R signal 415-*c*. For example, the UE 115 may monitor the CR subband 405-*b* and detect the CR-R signal 415-*c*, but subsequently determine that the data channel 410-*b* is available for the pre-grant response 425-*b* based at least in part on receiving the pre-grant 420-*b*. In other words, the UE 115 may interpret the pre-grant 420-*b* associated with CR-R signal 415-*c* as an implicit or explicit permission to use the data channel 410-*b* for transmitting the responsive pre-grant response 425-*b*. In other examples, the transmission of the pre-grant response 425-*b* may be otherwise allowed to ignore or supersede a detection of the CR-T signal 415-*c*.

The base station 105 may receive the pre-grant response 425-*b*, and in response, the base station 105 may transmit uplink resources grant 430-*b* to the UE 115, and the UE 115 may transmit uplink data 440 using data channel 410-*a* on the uplink resources.

In some examples the base station 105 may transmit the uplink resources grant 430-*a* on the data channel 410-*b* because a channel reservation of the CR-T signal 415-*d* does not include the duration used by the base station 105 to transmit the uplink resources grant 430-*b*. In other examples, the channel reservation of the CR-T signal 415-*d* may include the duration used by the base station 105 to transmit the uplink resources grant 430-*b*, and the base station 105 may be permitted to transmit the uplink resources grant 430-*b* on the data channel 410-*b* despite the channel reservation of the CR-T signal 415-*d*. For example, the base station 105 may monitor the CR subband 405-*b* and detect the CR-T signal 415-*d*, but subsequently determine that the data channel 410-*b* is available for the uplink resources grant 430-*b* based at least in part on receiving the pre-grant response 425-*b*. In other words, the base station 105 may interpret the pre-grant response 425-*b* associated with the CR-T signal 415-*d* as an implicit permission to use the data channel 410-*b* for transmitting the responsive uplink resources grant 430-*b*. In other examples, the transmission of the uplink resources grant 430-*b* may be otherwise allowed to ignore or supersede a detection of the CR-T signal 415-*d* (e.g., because the base station 105 had already reserved the data channel 410-*b* for the uplink resources grant 430-*a* by transmitting the CR-T signal 415-*c*).

Similarly, in some examples the UE 115 may transmit the uplink data 440 on the data channel 410-*b* because a channel reservation of the CR-R signal 415-c does not include the duration used by the UE 115 to transmit the uplink data 440. In other examples, the channel reservation of the CR-R signal 415-c may include the duration used by the UE 115 to transmit the uplink data 440, and the UE 115 may be permitted to transmit the uplink data 440 on the data channel 410-b despite the channel reservation of the CR-R signal 415-c. For example, the UE 115 may monitor the CR subband 405-b and detect the CR-R signal 415-c, but subsequently determine that the data channel 410-b is available for the uplink data 440 based at least in part on receiving the uplink resources grant 430-b. In other words, the UE 115 may interpret the uplink resources grant 430-b (e.g., associated with the CR-R signal 415-c) as an implicit or explicit permission to use the data channel 410-b for transmitting the uplink data 440. In other examples, the transmission of the uplink data 440 may be otherwise allowed to ignore or supersede a detection of the CR-R signal 415-c (e.g., because the UE 115 had already reserved the data channel 410-b for the uplink data 440 by transmitting the CR-T signal 415-d).

Figure 5:
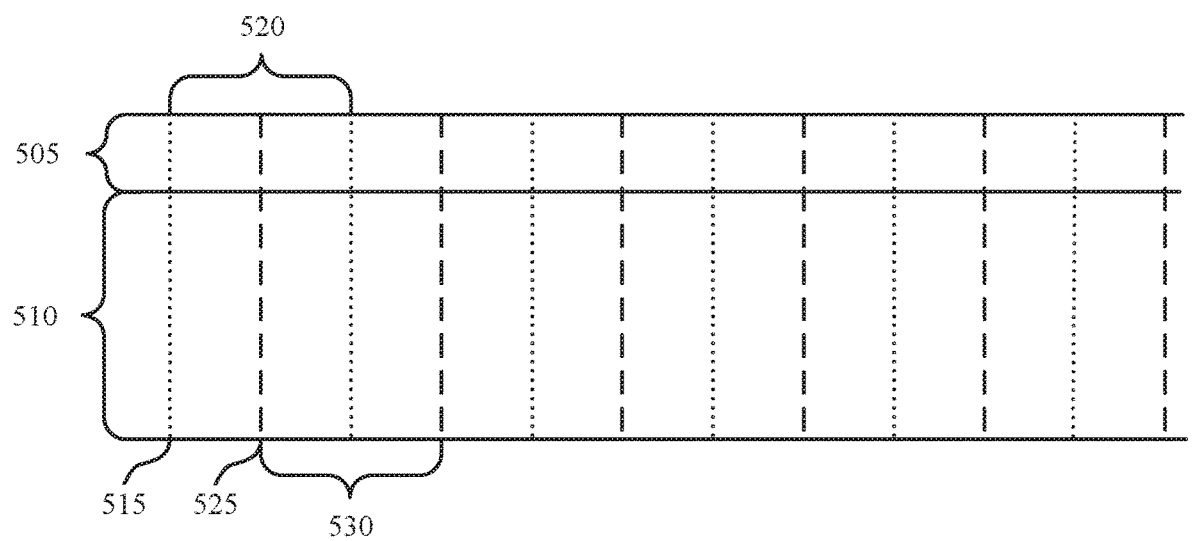
FIG. 5 illustrates an example of an asynchronous channel reservation scheme that supports CR signal design for shared spectrum in accordance with aspects of the present disclosure.
Figure 5:

FIG. 5 illustrates an example of an asynchronous channel reservation scheme 500 that supports CR signal design for shared spectrum in accordance with aspects of the present disclosure. Wireless devices sharing a CR subband 505 may have different synchronization granularities and assume different base station synchronization granularities for the CR subband 505 and data channel 510. In some examples, a frequency domain channel may be divided into the CR subband 505 and data channel 510, and in such cases, the data channel 510 may be an example of a data subband.

Multiple wireless devices may use the CR subband 505 to reserve the data channel 510. The CR subband 505 and the data channel 510 may have different levels (e.g., granularities) of synchronization, and base stations 105 may assume synchronization levels for the channel and sub-channel separately. For example, a base station 105 may identify the CR subband 505 to be asynchronous, have OFDM level synchronization, have slot level synchronization, or have frame level synchronization. Similarly, the base station 105 may consider the data channel 510 to be asynchronous, have OFDM level synchronization, have slot level synchronization, or have frame level synchronization. Each combination of synchronization for the data channel 510 and CR subband 505 may have different design implications.

As an example, at 515, a first wireless device may identify a start of slot 520 (e.g., according to the timing of the first wireless device). At 525, a second wireless device may identify a start of slot 530 (e.g., according to the timing of the second wireless device). The first wireless device and the second wireless device may, for example, be completely asynchronous or have an OFDM level synchronization. In some cases, the first and second wireless devices may be synchronized with other wireless devices, but not with each other.

In one example, the first wireless device may transmit a CR signal at the beginning of the slot 520. The second wireless device may monitor the CR subband 505 and detect the CR signal transmitted by the first wireless device. In response, the second wireless device may refrain from transmitting according to a granularity associated with the CR subband 505, which may or may not be the same as a granularity of the data channel 510. For example, when assuming a slot-level granularity for the CR subband 505, the second wireless device may refrain from transmitting during the slot 530 if the first wireless device has reserved the data channel 510 over a duration that overlaps with the slot 530 (e.g., across the slot 520). In some examples, the second wireless device may refrain from transmitting during the slot 530 based at least in part on assuming that the first wireless device performs channel reservation according to slot-level granularity, or by identifying a slot-level channel reservation duration from the detected CR signal transmitted by the first wireless device.

Thus, by using a granularity associated with the CR subband 505, the use of a dedicated CR subband for reserving one or more frequency domain channels of a shared radio frequency spectrum band may be beneficial in reducing interference between wireless devices and increasing overall throughput and successful transmission and reception of data signals even when the first and second wireless devices are not synchronized.

Figure 6:
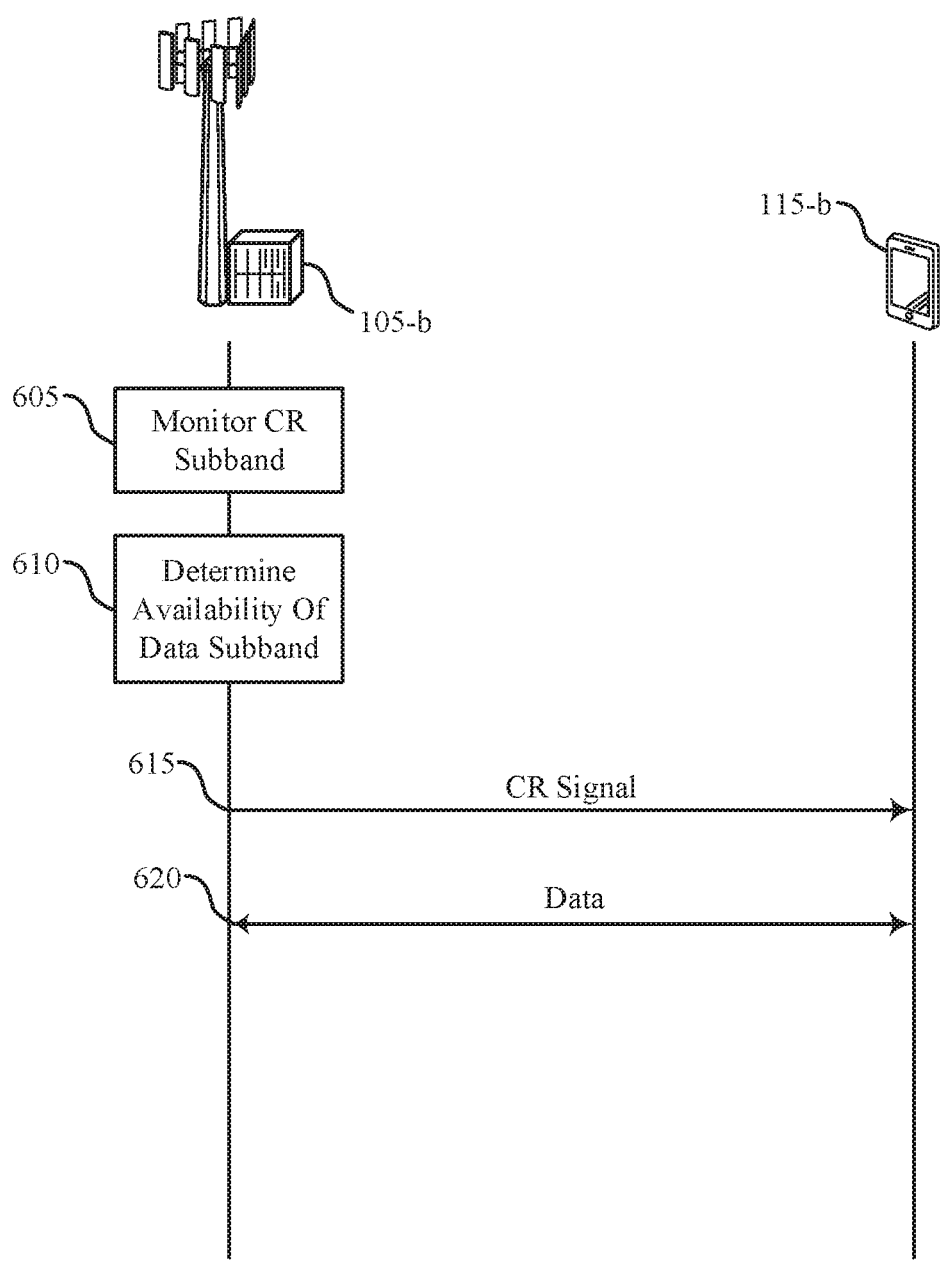
FIG. 6 illustrates an example of a process flow that supports CR signal design for shared spectrum in accordance with aspects of the present disclosure.

FIG. 6 illustrates an example of a process flow 600 that supports CR signal design for shared spectrum in accordance with aspects of the present disclosure. The process flow 600 illustrates base station 105-b and UE 115-b, but the channel reservation process may occur between any combination of UEs 115 and base stations 105. In some examples, UE 115-b and base station 105-b may be examples of a UE 115 and a base station 105, as described with reference to FIGS. 1 and 2.

At 605, base station 105-b monitors a CR subband for CR signal transmissions from other wireless devices. In some examples, base station 105-b may monitor a first frequency subband of a shared radio frequency spectrum band, the first frequency subband being dedicated for CR signals.

At 610, base station 105-b may determine whether a data channel is available for use based on the monitoring of the CR subband. In some examples the base station 105-b may determine an availability of a second frequency subband of the shared radio frequency spectrum band based on the monitoring of the first frequency subband, the second frequency subband being dedicated for data transmissions. In some examples, determining the availability includes decoding a second CR signal transmitted by a second wireless device using resources of the first frequency subband, the second CR signal indicating an end of a transmission by the second wireless device using resources of the second frequency subband.

At 615, base station 105-b may transmit a CR signal (e.g., to UE 115-b or other wireless devices in the system) using the CR subband. In some examples the base station 105-b may transmit the CR signal using resources of the first frequency subband, and the CR signal may indicate a reservation of the second frequency subband based on the determined availability of the second frequency subband. In some examples, base station 105-b may determine a time to transmit the CR signal based at least in part on the end of the transmission by the second wireless device. In some examples, base station 105-b may transmit a pre-grant signal or a pre-grant response signal concurrently with the CR signal.

At 620, base station 105-b may communicate transmit or receive data on the data subband (e.g., depending on whether the data subband has been reserved for uplink or downlink transmissions). In some examples the base station 105-b may transmit a message using resources of the second frequency subband concurrently with or after the transmission of the CR signal. In some examples, the transmission of the CR signal and the transmission of the message are performed using the same one or more transmission beams.

Figure 7:
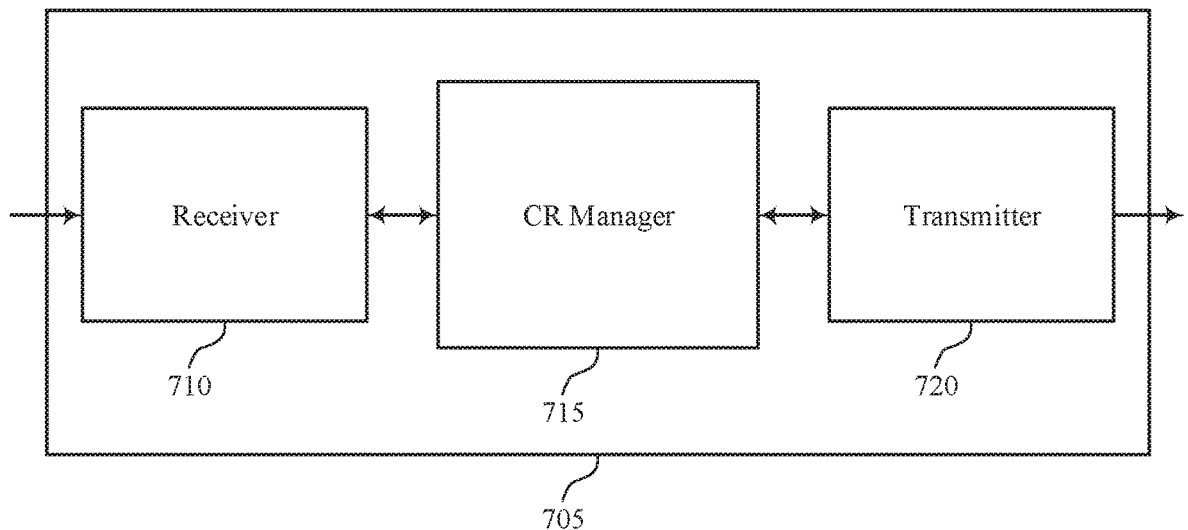
FIGS. 7 and 8 show block diagrams of wireless devices that support CR signal design for shared spectrum in accordance with aspects of the present disclosure.

FIG. 7 shows a block diagram 700 of a wireless device 705 that supports CR signal design for shared spectrum in accordance with aspects of the present disclosure. Wireless device 705 may be an example of aspects of a base station 105 or a UE 115 as described with reference to FIG. 1, 2, or 6. Wireless device 705 may include a receiver 710, a channel reservation manager 715, and a transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to CR signal design for shared spectrum, etc.). Information may be passed on to other components of the wireless device 705. The receiver 710 may be an example of aspects of the transceiver 1035 described with reference to FIG. 10. The receiver 710 may utilize a single antenna or a set of antennas.

Channel reservation manager 715 may monitor (e.g., in cooperation with the received 710) a first frequency subband of a shared radio frequency spectrum band, the first frequency subband being dedicated for CR signals. Channel reservation manager 715 may determine an availability of a second frequency subband of the shared radio frequency spectrum band based on the monitoring of the first frequency subband, the second frequency subband being dedicated for data transmissions. In some cases, at least a portion of the first frequency subband overlaps at least a portion of the second frequency subband. In some cases, the first frequency subband includes a set of non-contiguous partitions of the shared radio frequency spectrum band. In some cases, the first frequency subband and the second frequency band are interlaced in a frequency domain. In some cases, the second frequency subband spans a bandwidth larger than the first frequency subband. In some cases, the first frequency subband is located at an edge of a channel of the shared radio frequency spectrum band. Channel reservation manager 715 may transmit (e.g., in cooperation with the transmitter 720) a CR signal using resources of the first frequency subband, the CR signal indicating a reservation of the second frequency subband based on the determined availability of the second frequency subband.

Channel reservation manager 715 and/or at least some of its various sub-components may be implemented in hardware, software executed by a processor, firmware, or any combination thereof. If implemented in software executed by a processor, the functions of the channel reservation manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Channel reservation manager 715 may be an example of aspects of the channel reservation manager 1015 described with reference to FIG. 10.

The channel reservation manager 715 and/or at least some of its various sub-components may be physically located at various positions, including being distributed such that portions of functions are implemented at different physical locations by one or more physical devices. In some examples, channel reservation manager 715 and/or at least some of its various sub-components may be a separate and distinct component in accordance with various aspects of the present disclosure. In other examples, channel reservation manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 720 may transmit signals generated by other components of the wireless device 705. In some examples, the transmitter 720 may be collocated with the receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit a message using resources of the second frequency subband concurrently with or after the transmission of the CR signal. In some cases, the transmission of the CR signal and the transmission of the message are performed using the same one or more transmission beams. In some cases, the transmission of the CR signal and the transmission of the message are performed using a single carrier waveform.

Figure 8:
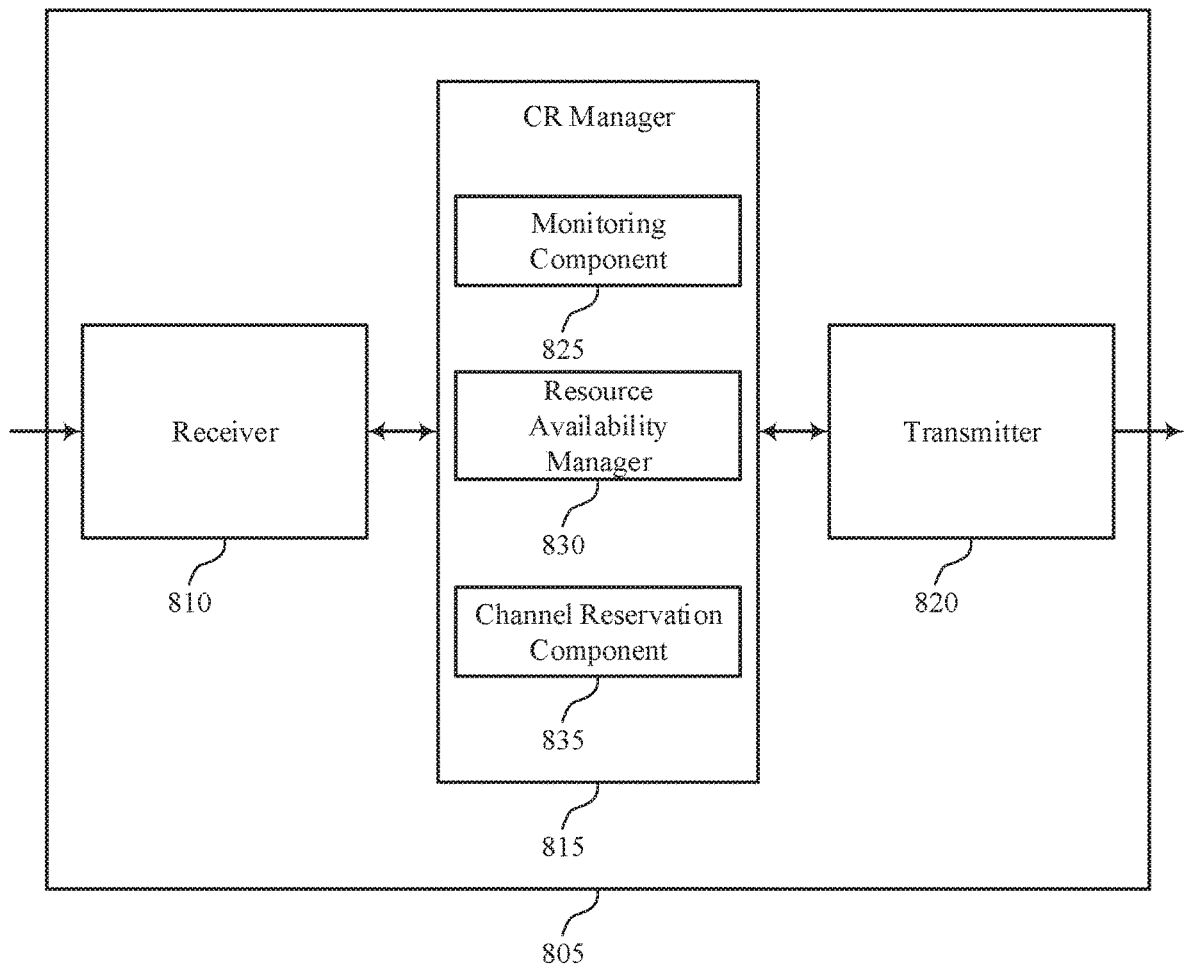

FIG. 8 shows a block diagram 800 of a wireless device 805 that supports CR signal design for shared spectrum in accordance with aspects of the present disclosure. Wireless device 805 may be an example of aspects of a base station 105, a UE 115, or a wireless device 705 as described with reference to FIGS. 1, 2, 6, and 7. Wireless device 805 may include a receiver 810, a channel reservation manager 815, and a transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to CR signal design for shared spectrum, etc.). Information may be passed on to other components of the wireless device 805. The receiver 810 may be an example of aspects of the transceiver 1035 described with reference to FIG. 10. The receiver 810 may utilize a single antenna or a set of antennas.

Channel reservation manager 815 may be an example of aspects of the channel reservation managers 715 or 1015 described with reference to FIG. 7 or 10. Channel reservation manager 815 may include a monitoring component 825, a resource availability manager 830, and a channel reservation component 835.

Monitoring component 825 may monitor (e.g., in cooperation with a receiver) a first frequency subband of a shared radio frequency spectrum band, the first frequency subband being dedicated for CR signals.

Resource availability manager 830 may determine an availability of a second frequency subband of the shared radio frequency spectrum band based on the monitoring of the first frequency subband, the second frequency subband being dedicated for data transmissions. In some cases, at least a portion of the first frequency subband overlaps at least a portion of the second frequency subband. In some cases, the first frequency subband includes a set of non-contiguous partitions of the shared radio frequency spectrum band. In some cases, the first frequency subband and the second frequency band are interlaced in a frequency domain. In some cases, the second frequency subband spans a bandwidth larger than the first frequency subband. In some cases, the first frequency subband is located at an edge of a channel of the shared radio frequency spectrum band.

Resource availability manager 830 may determine a time to transmit a CR signal based on the end of a transmission by a second wireless device. In some cases, determining the availability of the second frequency subband includes decoding a second CR signal transmitted by the second wireless device using resources of the first frequency subband, the second CR signal indicating an end of a transmission by the second wireless device using resources of the second frequency subband. In some examples, the resource availability manager 830 may determine an availability of a third frequency subband of the shared radio frequency spectrum band based on the monitoring of the first frequency subband, the third frequency subband being dedicated for data transmissions. In some cases, the third frequency subband is non-overlapping with the first frequency subband and the second frequency subband. In some examples, at least a portion of the third frequency subband overlaps at least a portion of the second frequency subband.

Channel reservation component 835 may transmit (e.g., in cooperation with the transmitter 820) a CR signal using resources of the first frequency subband, the CR signal indicating a reservation of the second frequency subband based on the determined availability of the second frequency subband. In some cases, the CR signal indicates a duration of use of the second frequency subband. Channel reservation component 835 may transmit a second CR signal using resources of the first frequency subband, the second CR signal indicating a reservation of a third frequency subband based on the determined availability of the third frequency subband.

Transmitter 820 may transmit signals generated by other components of the wireless device 805. In some examples, the transmitter 820 may be collocated with the receiver 810 in a transceiver module. For example, the transmitter 820 may be an example of aspects of the transceiver 1035 described with reference to FIG. 10. The transmitter 820 may utilize a single antenna or a set of antennas.

Figure 9:
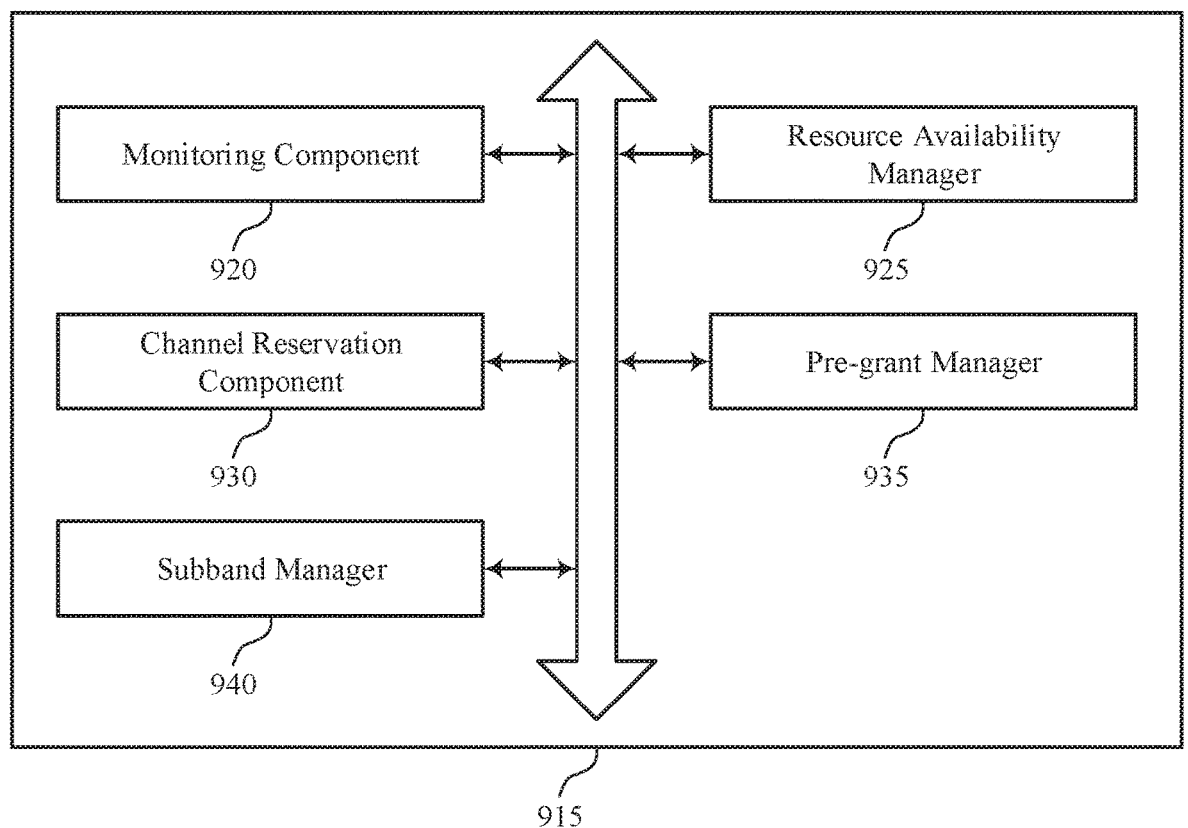
FIG. 9 shows a block diagram of a channel reservation manager that supports CR signal design for shared spectrum in accordance with aspects of the present disclosure.

FIG. 9 shows a block diagram 900 of a channel reservation manager 915 that supports CR signal design for shared spectrum in accordance with aspects of the present disclosure. The channel reservation manager 915 may be an example of aspects of a channel reservation manager 715, a channel reservation manager 815, or a channel reservation manager 1015 described with reference to FIGS. 7, 8, and 10. The channel reservation manager 915 may include a monitoring component 920, a resource availability manager 925, a channel reservation component 930, a pre-grant manager 935, and a subband manager 940. Each of these modules may communicate, directly or indirectly, with one another (e.g., via one or more buses).

Monitoring component 920 may monitor (e.g., in cooperation with a receiver) a first frequency subband of a shared radio frequency spectrum band, the first frequency subband being dedicated for CR signals.

Resource availability manager 925 may determine an availability of a second frequency subband of the shared radio frequency spectrum band based on the monitoring of the first frequency subband, the second frequency subband being dedicated for data transmissions. In some cases, at least a portion of the first frequency subband overlaps at least a portion of the second frequency subband. In some cases, the first frequency subband includes a set of non-contiguous partitions of the shared radio frequency spectrum band. In some cases, the first frequency subband and the second frequency band are interlaced in a frequency domain. In some cases, the second frequency subband spans a bandwidth larger than the first frequency subband. In some cases, the first frequency subband is located at an edge of a channel of the shared radio frequency spectrum band.

Resource availability manager 925 may determine a time to transmit a CR signal based on the end of a transmission by a second wireless device. In some cases, determining the availability of the second frequency subband includes decoding a second CR signal transmitted by the second wireless device using resources of the first frequency subband, the second CR signal indicating an end of a transmission by the second wireless device using resources of the second frequency subband. Resource availability manager 925 may determine an availability of a third frequency subband of the shared radio frequency spectrum band based on the monitoring of the first frequency subband, the third frequency subband being dedicated for data transmissions. In some examples, at least a portion of the third frequency subband overlaps at least a portion of the second frequency subband. In some cases, the third frequency subband is non-overlapping with the first frequency subband and the second frequency subband.

Channel reservation component 930 may transmit (e.g., in cooperation with a transmitter) a CR signal using resources of the first frequency subband, the CR signal indicating a reservation of the second frequency subband based on the determined availability of the second frequency subband. In some cases, the CR signal indicates a duration of use of the second frequency subband. Channel reservation component 930 may transmit a second CR signal using resources of the first frequency subband, the second CR signal indicating a reservation of a third frequency subband based on the determined availability of the third frequency subband.

Pre-grant manager 935 may transmit a pre-grant signal or a pre-grant response signal (e.g., a pre-grant acknowledgment) concurrently with the CR signal.

Subband manager 940 may assume a first base station synchronization granularity for the first frequency subband and a second base station synchronization granularity for the second frequency subband, where the first base station synchronization granularity is different from the second base station synchronization granularity.

Figure 10:
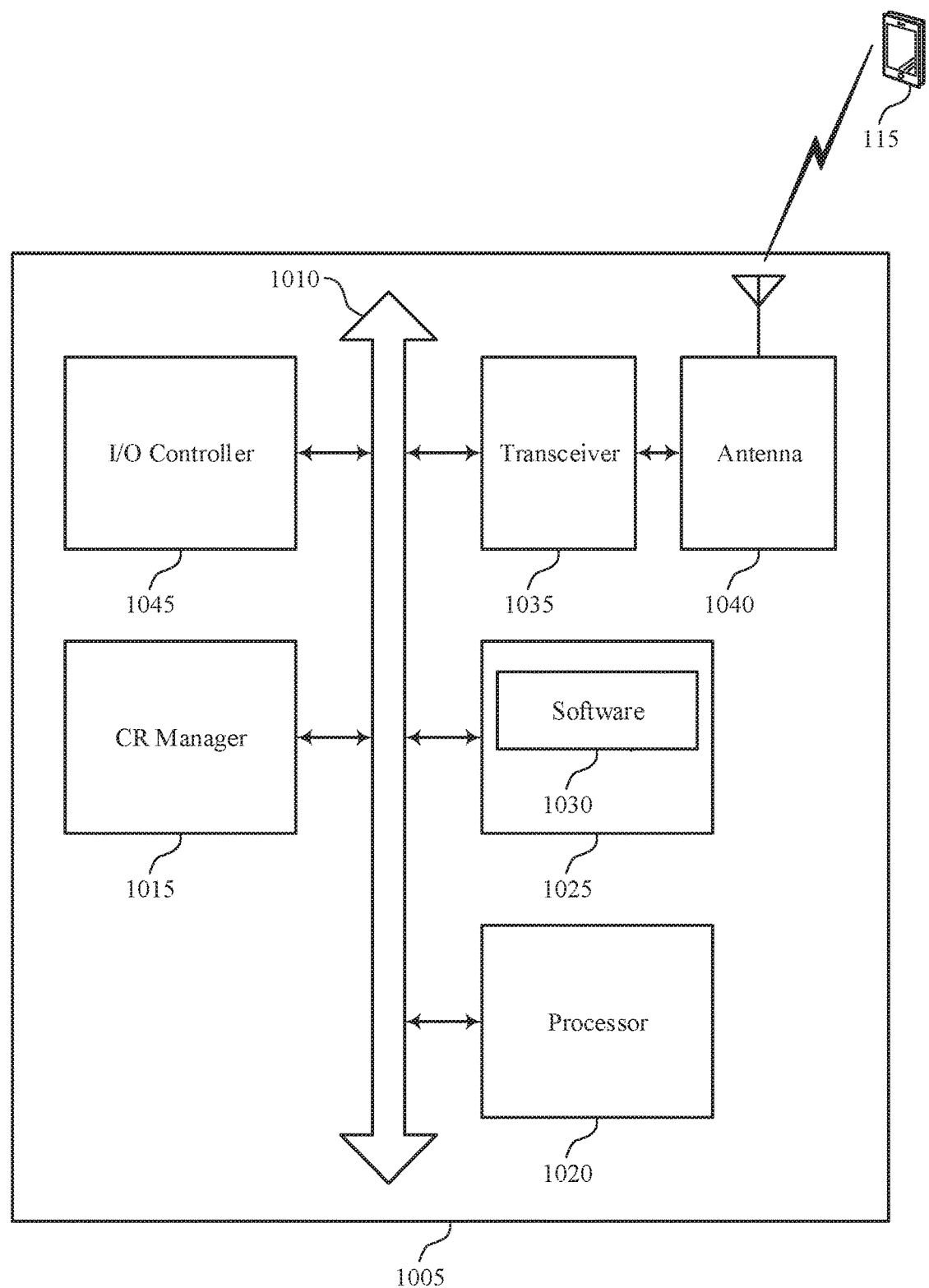
FIG. 10 shows a diagram of a system including a device that supports CR signal design for shared spectrum in accordance with aspects of the present disclosure.

FIG. 10 shows a diagram of a system 1000 including a device 1005 that supports CR signal design for shared spectrum in accordance with aspects of the present disclosure. Device 1005 may be an example of or include the components of a base station 105, a UE 115, a wireless device 705, or a wireless device 805 as described above, e.g., with reference to FIGS. 1, 2, 6, 7 and 8. Device 1005 may include components for bi-directional voice and data communications including components for transmitting and receiving communications, including channel reservation manager 1015, processor 1020, memory 1025, software 1030, transceiver 1035, antenna 1040, and I/O controller 1045. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting CR signal design for shared spectrum).

Memory 1025 may include random access memory (RAM) and read only memory (ROM). The memory 1025 may store computer-readable, computer-executable software 1030 including instructions that, when executed, cause the device 1005 to perform various functions described herein.

In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support CR signal design for shared spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
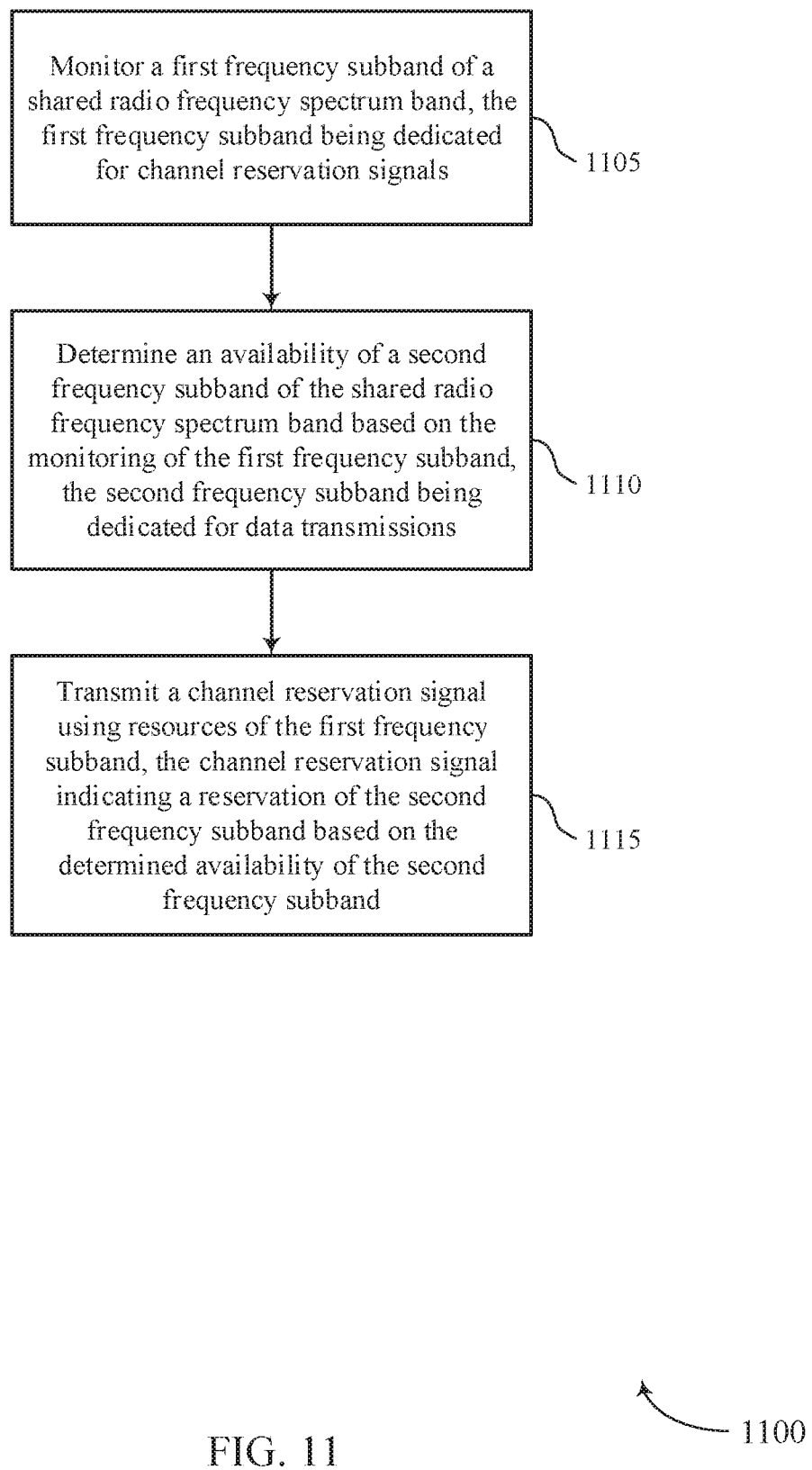
FIGS. 11 through 14 show flowcharts illustrating methods for CR signal design for shared spectrum in accordance with aspects of the present disclosure.

FIG. 11 shows a flowchart illustrating a method 1100 for CR signal design for shared spectrum in accordance with aspects of the present disclosure. The operations of method 1100 may be implemented by a wireless device or its components as described herein. For example, the operations of method 1100 may be performed by a channel reservation manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1105 the wireless device may monitor a first frequency subband of a shared radio frequency spectrum band, the first frequency subband being dedicated for CR signals. The operations of block 1105 may be performed according to the methods described with reference to FIGS. 1 through 6. In certain examples, aspects of the operations of block 1105 may be performed by a monitoring component as described with reference to FIGS. 7 through 10.

At block 1110 the wireless device may determine an availability of a second frequency subband of the shared radio frequency spectrum band based on the monitoring of the first frequency subband, the second frequency subband being dedicated for data transmissions. The operations of block 1110 may be performed according to the methods described with reference to FIGS. 1 through 6. In certain examples, aspects of the operations of block 1110 may be performed by a resource availability manager as described with reference to FIG. 8 or 9.

At block 1115 the wireless device may transmit a CR signal using resources of the first frequency subband, the CR signal indicating a reservation of the second frequency subband based on the determined availability of the second frequency subband. The operations of block 1115 may be performed according to the methods described with reference to FIGS. 1 through 6. In certain examples, aspects of the operations of block 1115 may be performed by a channel reservation component as described with reference to FIG. 8 or 9.

Figure 12:
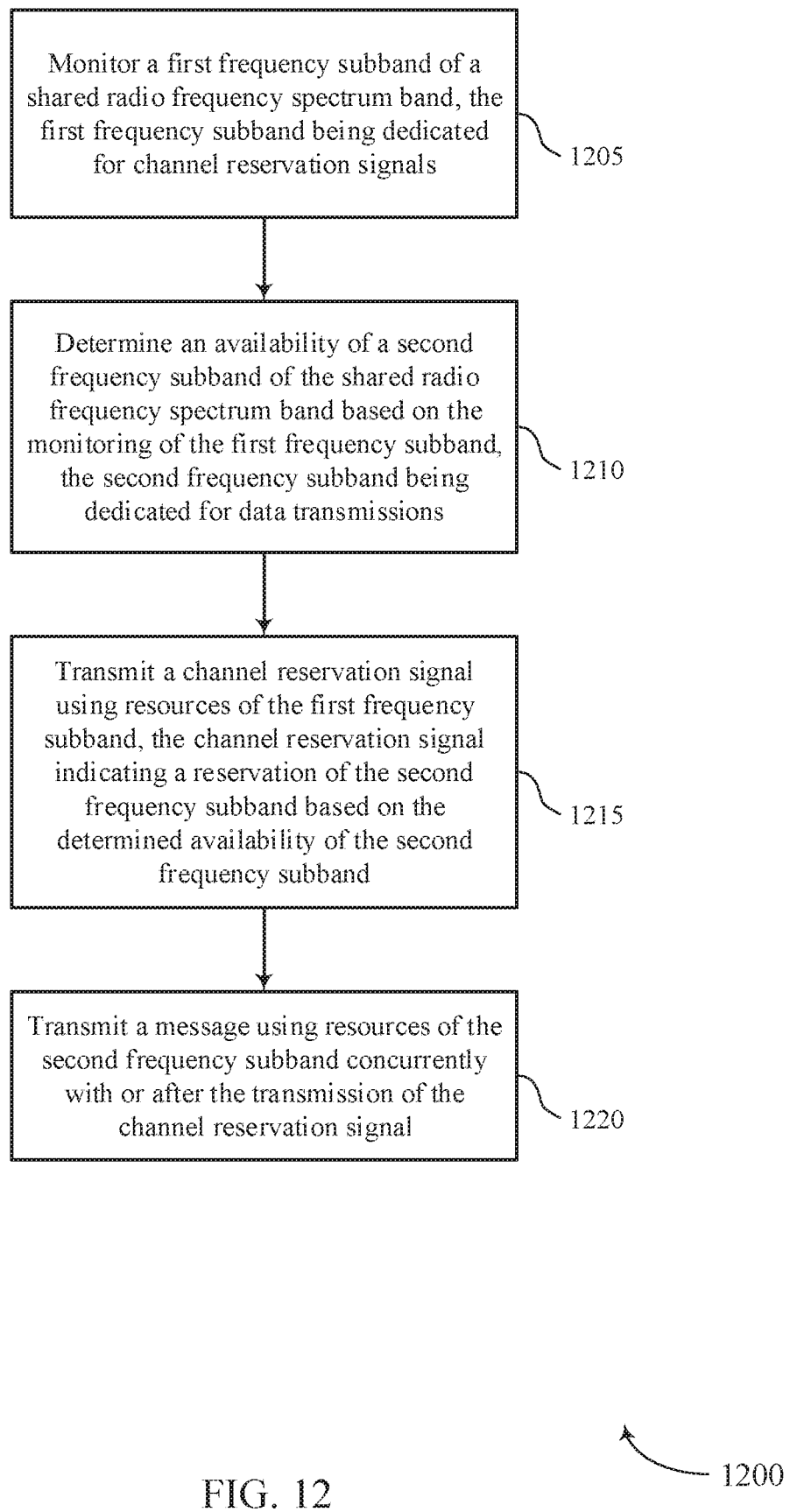

FIG. 12 shows a flowchart illustrating a method 1200 for CR signal design for shared spectrum in accordance with aspects of the present disclosure. The operations of method 1200 may be implemented by a wireless device or its components as described herein. For example, the operations of method 1200 may be performed by a channel reservation manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1205 the wireless device may monitor a first frequency subband of a shared radio frequency spectrum band, the first frequency subband being dedicated for CR signals. The operations of block 1205 may be performed according to the methods described with reference to FIGS. 1 through 6. In certain examples, aspects of the operations of block 1205 may be performed by a monitoring component as described with reference to FIG. 8 or 9.

At block 1210 the wireless device may determine an availability of a second frequency subband of the shared radio frequency spectrum band based on the monitoring of the first frequency subband, the second frequency subband being dedicated for data transmissions. The operations of block 1210 may be performed according to the methods described with reference to FIGS. 1 through 6. In certain examples, aspects of the operations of block 1210 may be performed by a resource availability manager as described with reference to FIG. 8 or 9.

At block 1215 the wireless device may transmit a CR signal using resources of the first frequency subband, the CR signal indicating a reservation of the second frequency subband based on the determined availability of the second frequency subband. The operations of block 1215 may be performed according to the methods described with reference to FIGS. 1 through 6. In certain examples, aspects of the operations of block 1215 may be performed by a channel reservation component as described with reference to FIG. 8 or 9.

At block 1220 the wireless device may transmit a message using resources of the second frequency subband concurrently with or after the transmission of the CR signal. The operations of block 1220 may be performed according to the methods described with reference to FIGS. 1 through 6. In certain examples, aspects of the operations of block 1220 may be performed by a transmitter as described with reference to FIG. 7 or 8, or a transceiver as described with reference to FIG. 10.

Figure 13:
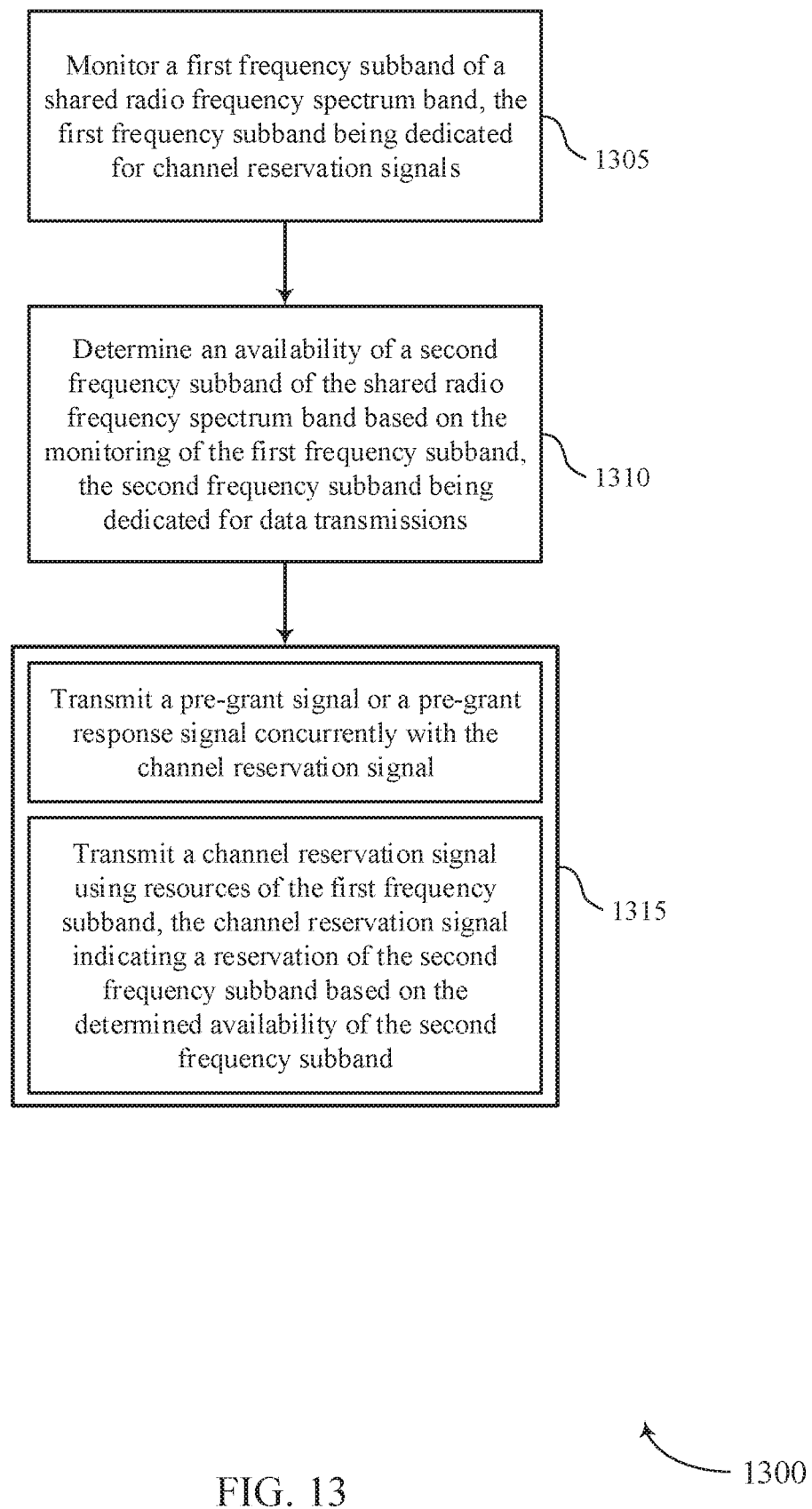

FIG. 13 shows a flowchart illustrating a method 1300 for CR signal design for shared spectrum in accordance with aspects of the present disclosure. The operations of method 1300 may be implemented by a wireless device or its components as described herein. For example, the operations of method 1300 may be performed by a channel reservation manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1305 the wireless device may monitor a first frequency subband of a shared radio frequency spectrum band, the first frequency subband being dedicated for CR signals. The operations of block 1305 may be performed according to the methods described with reference to FIGS. 1 through 6. In certain examples, aspects of the operations of block 1305 may be performed by a monitoring component as described with reference to FIG. 8 or 9.

At block 1310 the wireless device may determine an availability of a second frequency subband of the shared radio frequency spectrum band based on the monitoring of the first frequency subband, the second frequency subband being dedicated for data transmissions. The operations of block 1310 may be performed according to the methods described with reference to FIGS. 1 through 6. In certain examples, aspects of the operations of block 1310 may be performed by a resource availability manager as described with reference to FIG. 8 or 9.

At block 1315 the wireless device may transmit a CR signal using resources of the first frequency subband, the CR signal indicating a reservation of the second frequency subband based on the determined availability of the second frequency subband, and the wireless device may transmit a pre-grant signal or a pre-grant response signal concurrently with the CR signal. The operations of block 1315 may be performed according to the methods described with reference to FIGS. 1 through 6. In certain examples, aspects of the operations of block 1315 may be performed by a pre-grant manager and a channel reservation component as described with reference to FIG. 8 or 9.

Figure 14:
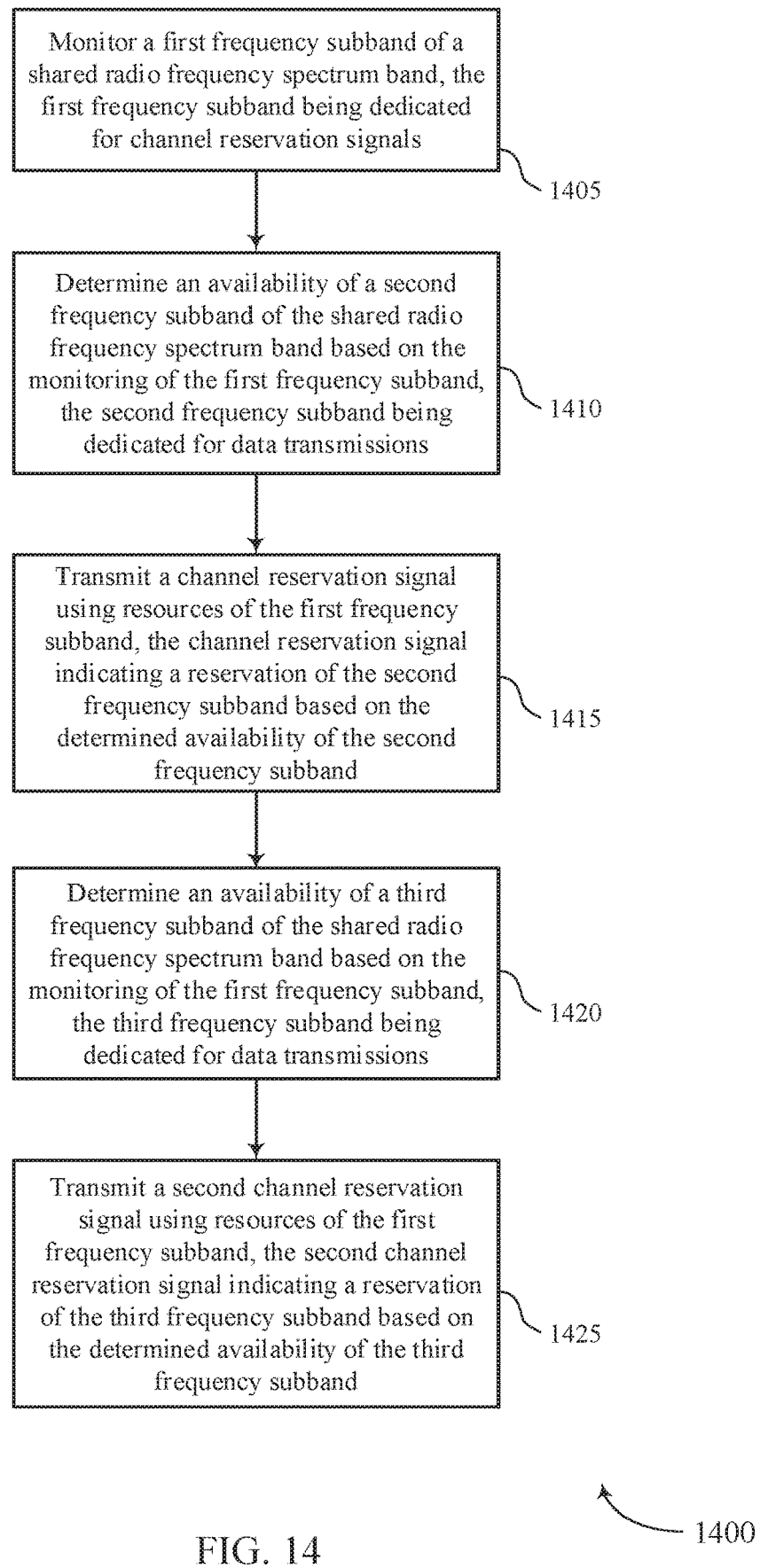

FIG. 14 shows a flowchart illustrating a method 1400 for CR signal design for shared spectrum in accordance with aspects of the present disclosure. The operations of method 1400 may be implemented by a wireless device or its components as described herein. For example, the operations of method 1400 may be performed by a channel reservation manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At block 1405 the wireless device may monitor a first frequency subband of a shared radio frequency spectrum band, the first frequency subband being dedicated for CR signals. The operations of block 1405 may be performed according to the methods described with reference to FIGS. 1 through 6. In certain examples, aspects of the operations of block 1405 may be performed by a monitoring component as described with reference to FIG. 8 or 9.

At block 1410 the wireless device may determine an availability of a second frequency subband of the shared radio frequency spectrum band based on the monitoring of the first frequency subband, the second frequency subband being dedicated for data transmissions. The operations of block 1410 may be performed according to the methods described with reference to FIGS. 1 through 6. In certain examples, aspects of the operations of block 1410 may be performed by a resource availability manager as described with reference to FIG. 8 or 9.

At block 1415 the wireless device may transmit a CR signal using resources of the first frequency subband, the CR signal indicating a reservation of the second frequency subband based on the determined availability of the second frequency subband. The operations of block 1415 may be performed according to the methods described with reference to FIGS. 1 through 6. In certain examples, aspects of the operations of block 1415 may be performed by a channel reservation component as described with reference to FIG. 8 or 9.

At block 1420 the wireless device may determine an availability of a third frequency subband of the shared radio frequency spectrum band based on the monitoring of the first frequency subband, the third frequency subband being dedicated for data transmissions. The operations of block 1420 may be performed according to the methods described with reference to FIGS. 1 through 6. In certain examples, aspects of the operations of block 620 may be performed by a resource availability manager as described with reference to FIG. 8 or 9.

At block 1425 the wireless device may transmit a second CR signal using resources of the first frequency subband, the second CR signal indicating a reservation of the third frequency subband based on the determined availability of the third frequency subband. The operations of block 1425 may be performed according to the methods described with reference to FIGS. 1 through 6. In certain examples, aspects of the operations of block 1425 may be performed by a channel reservation component as described with reference to FIG. 8 or 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring, by a first wireless device, a first frequency subband of a frequency domain channel of a shared radio frequency spectrum band, the first frequency subband of the frequency domain channel being dedicated for channel reservation signals;
determining an availability of a second frequency subband of the frequency domain channel of the shared radio frequency spectrum band based on the monitoring of the first frequency subband of the frequency domain channel, the second frequency subband of the frequency domain channel being dedicated for data transmissions; and
transmitting a channel reservation signal using resources of the first frequency subband of the frequency domain channel, the channel reservation signal indicating a reservation of the second frequency subband of the frequency domain channel based on the determined availability of the second frequency subband of the frequency domain channel.

2. The method of claim 1, wherein determining the availability of the second frequency subband of the frequency domain channel comprises:
decoding a second channel reservation signal transmitted by a second wireless device using resources of the first frequency subband of the frequency domain channel, the second channel reservation signal indicating an end of a transmission by the second wireless device using resources of the second frequency subband of the frequency domain channel.

3. The method of claim 2, further comprising:
determining a time to transmit the channel reservation signal based at least in part on the end of the transmission by the second wireless device.

4. The method of claim 1, wherein:
the channel reservation signal indicates a duration of use of the second frequency subband of the frequency domain channel.

5. The method of claim 1, further comprising:
transmitting a message using resources of the second frequency subband of the frequency domain channel concurrently with or after the transmission of the channel reservation signal.

6. The method of claim 5, wherein:
the transmission of the channel reservation signal and the transmission of the message are performed using the same one or more transmission beams.

7. The method of claim 1, further comprising:
receiving a message using resources of the second frequency subband of the frequency domain channel concurrently with or after the transmission of the channel reservation signal.

8. The method of claim 1, further comprising:
transmitting a pre-grant signal or a pre-grant response signal concurrently with the channel reservation signal.

9. The method of claim 1, further comprising:
determining an availability of a third frequency subband of the shared radio frequency spectrum band based on the monitoring of the first frequency subband of the frequency domain channel, the third frequency subband being dedicated for data transmissions; and
transmitting a second channel reservation signal using resources of the first frequency subband of the frequency domain channel, the second channel reservation signal indicating a reservation of the third frequency subband based on the determined availability of the third frequency subband.

10. The method of claim 9, wherein:
the third frequency subband is non-overlapping with the first frequency subband of the frequency domain channel and the second frequency subband of the frequency domain channel.

11. The method of claim 9, wherein:
at least a portion of the third frequency subband overlaps at least a portion of the second frequency subband of the frequency domain channel.

12. The method of claim 1, wherein:
the first frequency subband of the frequency domain channel comprises a plurality of non-contiguous partitions of the shared radio frequency spectrum band.

13. The method of claim 12, wherein:
the first frequency subband of the frequency domain channel and the second frequency band of the frequency domain channel are interlaced in a frequency domain.

14. The method of claim 1, wherein:
the second frequency subband of the frequency domain channel spans a bandwidth larger than the first frequency subband of the frequency domain channel.

15. The method of claim 1, wherein:
the first frequency subband of the frequency domain channel is located at an edge of a channel of the shared radio frequency spectrum band.

16. The method of claim 1, further comprising:
assuming a first base station synchronization granularity for the first frequency subband of the frequency domain channel and a second base station synchronization granularity for the second frequency subband of the frequency domain channel, wherein the first base station synchronization granularity is different from the second base station synchronization granularity.

17. An apparatus for wireless communication, comprising:
means for monitoring, by a first wireless device, a first frequency subband of a frequency domain channel of a shared radio frequency spectrum band, the first frequency subband of the frequency domain channel being dedicated for channel reservation signals;
means for determining an availability of a second frequency subband of the frequency domain channel of the shared radio frequency spectrum band based on the monitoring of the first frequency subband of the frequency domain channel, the second frequency subband of the frequency domain channel being dedicated for data transmissions; and
means for transmitting a channel reservation signal using resources of the first frequency subband of the frequency domain channel, the channel reservation signal indicating a reservation of the second frequency subband of the frequency domain channel based on the determined availability of the second frequency subband of the frequency domain channel.

18. An apparatus for wireless communication, comprising:
a processor;
memory in electronic communication with the processor; and
instructions stored in the memory, wherein the instructions are executable by the processor to:
monitor, by a first wireless device, a first frequency subband of a frequency domain channel of a shared radio frequency spectrum band, the first frequency subband of the frequency domain channel being dedicated for channel reservation signals;
determine an availability of a second frequency subband of the frequency domain channel of the shared radio frequency spectrum band based on the monitoring of the first frequency subband, the second frequency subband of the frequency domain channel being dedicated for data transmissions; and
transmit a channel reservation signal using resources of the first frequency subband of the frequency domain channel, the channel reservation signal indicating a reservation of the second frequency subband of the frequency domain channel based on the determined availability of the second frequency subband of the frequency domain channel.

19. The apparatus of claim 18, wherein the instructions are executable by the processor to:
decode a second channel reservation signal transmitted by a second wireless device using resources of the first frequency subband of the frequency domain channel, the second channel reservation signal indicating an end of a transmission by the second wireless device using resources of the second frequency subband of the frequency domain channel.

20. The apparatus of claim 18, wherein the channel reservation signal indicates a duration of use of the second frequency subband of the frequency domain channel.

21. The apparatus of claim 18, wherein the instructions are executable by the processor to:
transmit a message using resources of the second frequency subband of the frequency domain channel concurrently with or after the transmission of the channel reservation signal.

22. The apparatus of claim 18, wherein the instructions are executable by the processor to:
transmit a pre-grant signal or a pre-grant response signal concurrently with the channel reservation signal.

23. The apparatus of claim 18, wherein the instructions are executable by the processor to:
determine an availability of a third frequency subband of the shared radio frequency spectrum band based on the monitoring of the first frequency subband of the frequency domain channel, the third frequency subband being dedicated for data transmissions; and
transmit a second channel reservation signal using resources of the first frequency subband of the frequency domain channel, the second channel reservation signal indicating a reservation of the third frequency subband based on the determined availability of the third frequency subband.

24. The apparatus of claim 23, wherein the third frequency subband is non-overlapping with the first frequency subband of the frequency domain channel and the second frequency subband of the frequency domain channel.

25. The apparatus of claim 18, wherein the first frequency subband of the frequency domain channel comprises a plurality of non-contiguous partitions of the shared radio frequency spectrum band.

26. The apparatus of claim 18, wherein the first frequency subband of the frequency domain channel is located at an edge of a channel of the shared radio frequency spectrum band.

27. The apparatus of claim 18, wherein the instructions are executable by the processor to:
assume a first base station synchronization granularity for the first frequency subband of the frequency domain channel and a second base station synchronization granularity for the second frequency subband of the frequency domain channel; wherein the first base station synchronization granularity is different from the second base station synchronization granularity.

28. A non-transitory computer readable medium storing code for wireless communication, the code comprising instructions executable to:
monitor, by a first wireless device, a first frequency subband of a frequency domain channel of a shared radio frequency spectrum band, the first frequency subband of the frequency domain channel being dedicated for channel reservation signals;
determine an availability of a second frequency subband of the frequency domain channel of the shared radio frequency spectrum band based on the monitoring of the first frequency subband of the frequency domain channel, the second frequency subband of the frequency domain channel being dedicated for data transmissions; and transmit a channel reservation signal using resources of the first frequency subband of the frequency domain channel, the channel reservation signal indicating a reservation of the second frequency subband of the frequency domain channel based on the determined availability of the second frequency subband of the frequency domain channel.

* * * * *